United States Patent
Maillaud et al.

(10) Patent No.: US 12,459,238 B2
(45) Date of Patent: Nov. 4, 2025

(54) LAMINATED VEHICLE GLAZING AND DEVICE COMPRISING AN ASSOCIATED NEAR-INFRARED VISION SYSTEM

(71) Applicant: SAINT-GOBAIN GLASS FRANCE, Courbevoie (FR)

(72) Inventors: Laurent Maillaud, Aubervilliers (FR); Maxence Wilmet, Aubervilliers (FR)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 0 days.

(21) Appl. No.: 18/721,556

(22) PCT Filed: Dec. 16, 2022

(86) PCT No.: PCT/FR2022/052400
§ 371 (c)(1),
(2) Date: Jun. 18, 2024

(87) PCT Pub. No.: WO2023/118710
PCT Pub. Date: Jun. 29, 2023

(65) Prior Publication Data
US 2025/0058547 A1    Feb. 20, 2025

(30) Foreign Application Priority Data
Dec. 22, 2021    (FR) .................................. 2114260

(51) Int. Cl.
| | |
|---|---|
| B32B 7/12 | (2006.01) |
| B32B 3/26 | (2006.01) |
| B32B 7/023 | (2019.01) |
| B32B 17/10 | (2006.01) |

(52) U.S. Cl.
CPC ........ *B32B 17/10293* (2013.01); *B32B 3/266* (2013.01); *B32B 7/023* (2019.01); *B32B 7/12* (2013.01); *B32B 17/10036* (2013.01); *B32B 17/10119* (2013.01); *B32B 17/10651* (2013.01);
(Continued)

(58) Field of Classification Search
CPC .......... B32B 3/085; B32B 3/14; B32B 3/266; B32B 7/12; B32B 17/10036; B32B 17/10293; B32B 17/10348
See application file for complete search history.

(56) References Cited

U.S. PATENT DOCUMENTS

| | | | |
|---|---|---|---|
| 2004/0258929 | A1 | 12/2004 | Glaubitt et al. |
| 2024/0123709 | A1* | 4/2024 | Yavari ............... B32B 17/10761 |
| 2024/0181751 | A1* | 6/2024 | Girard ............... B32B 17/10119 |

FOREIGN PATENT DOCUMENTS

| | | |
|---|---|---|
| EP | 1 329 433 A1 | 7/2003 |
| WO | WO 2004/025334 A2 | 3/2004 |
| WO | WO 2005/049757 A1 | 6/2005 |

(Continued)

OTHER PUBLICATIONS

International Search Report as issued in International Patent Application No. PCT/FR2022/052400, dated Mar. 31, 2023.

*Primary Examiner* — Elizabeth E Mulvaney
(74) *Attorney, Agent, or Firm* — Pillsbury Winthrop Shaw Pittman LLP

(57) ABSTRACT

A vehicle laminated glazed unit includes a first extra clear glass sheet (exterior glazed unit), a lamination interlayer, and a second glass sheet (interior glazed unit) with a through-hole, wherein the second sheet includes a piece and a masking layer for attaching that piece onto the first sheet.

20 Claims, 11 Drawing Sheets

(52) U.S. Cl.
    CPC . *B32B 2307/4026* (2013.01); *B32B 2307/416* (2013.01)

(56) References Cited

FOREIGN PATENT DOCUMENTS

| WO | WO 2021/136907 A1 | 7/2021 |
| WO | WO 2021/136908 A1 | 7/2021 |

* cited by examiner

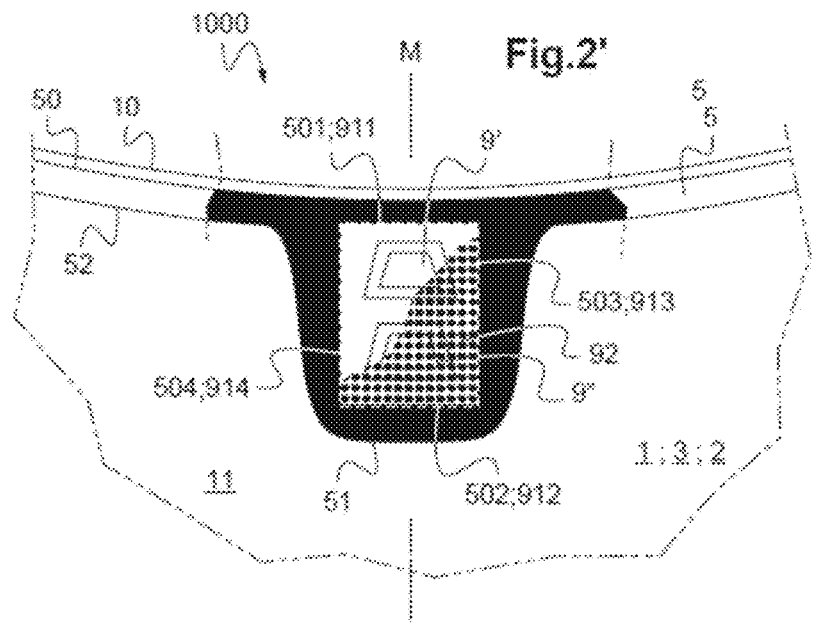
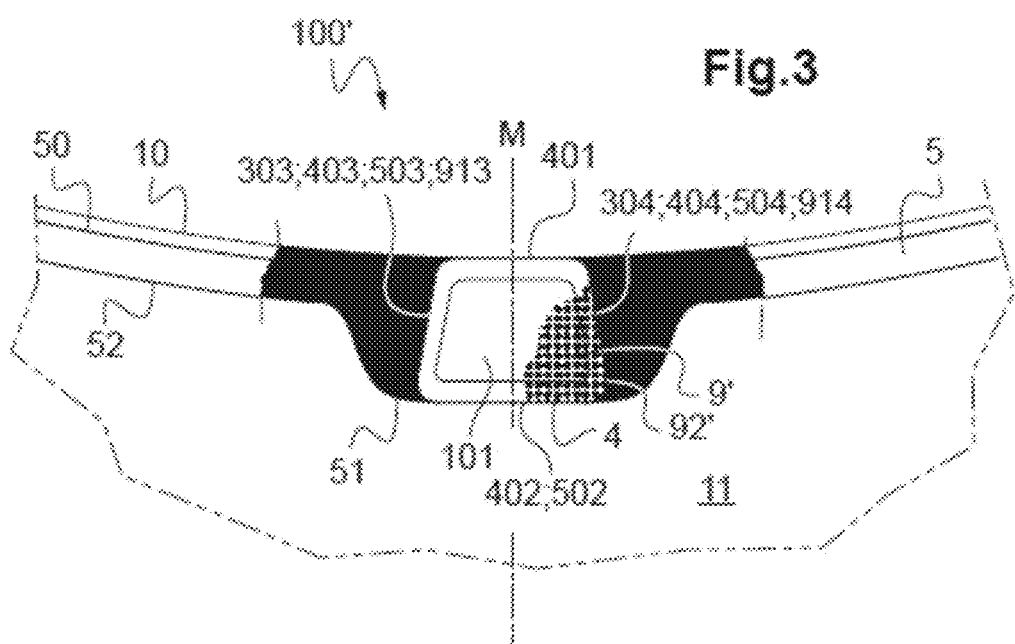

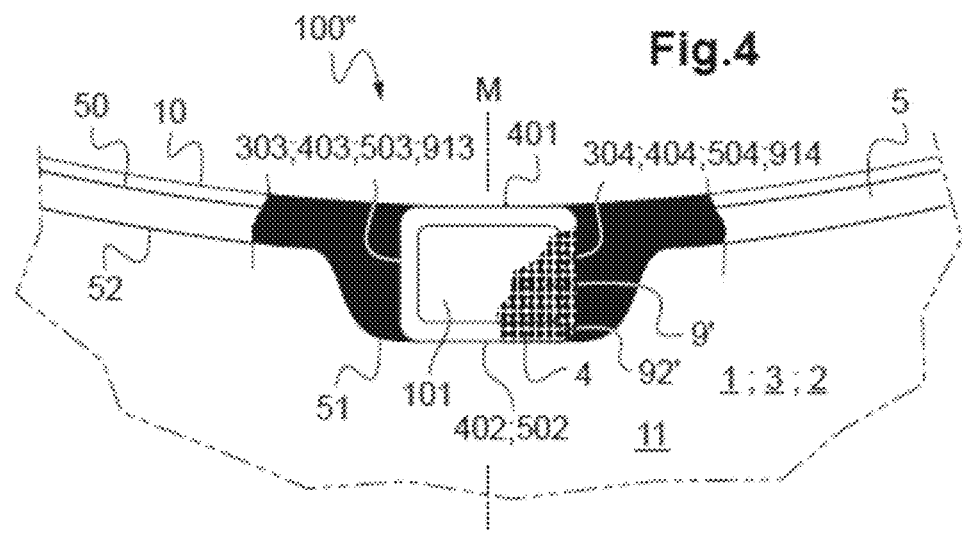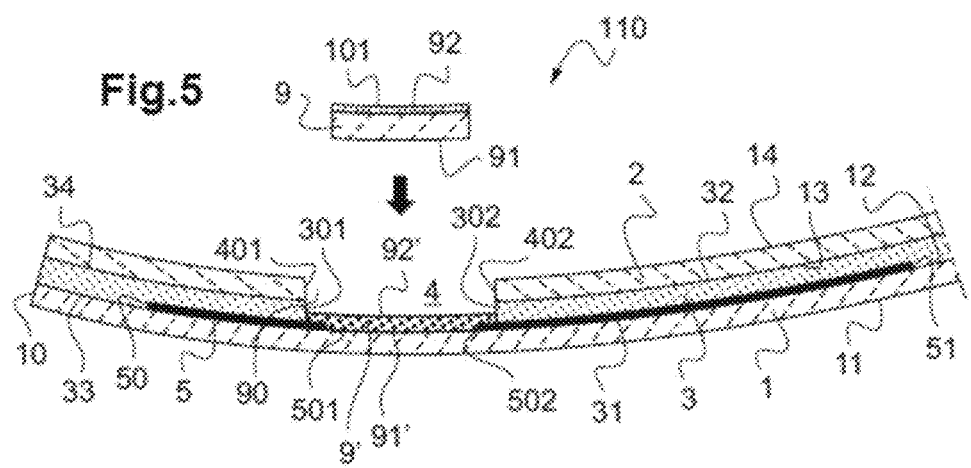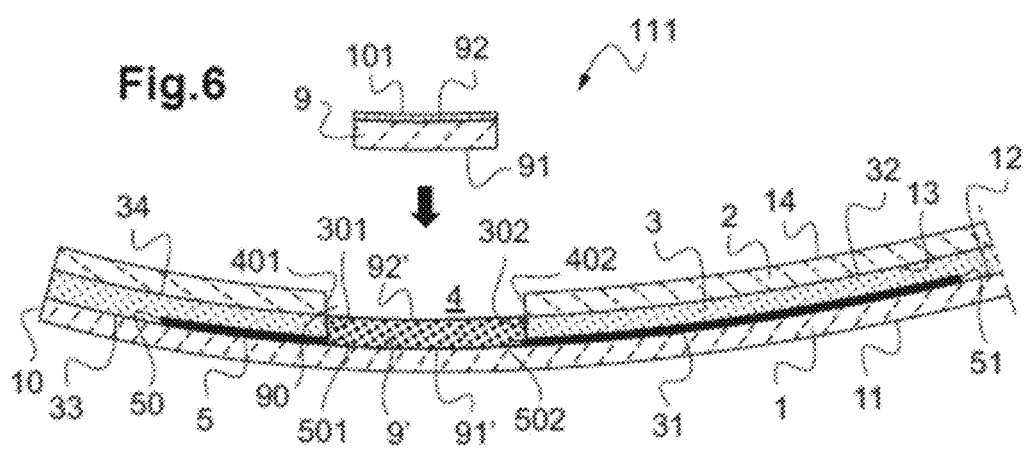

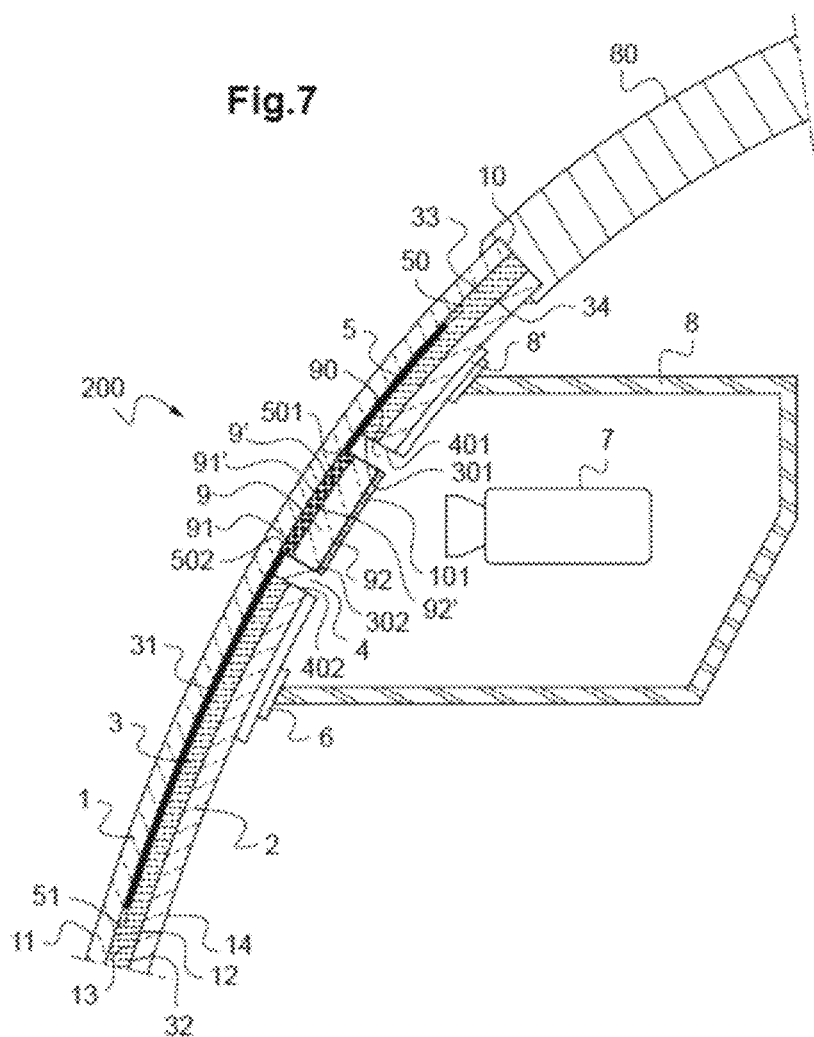
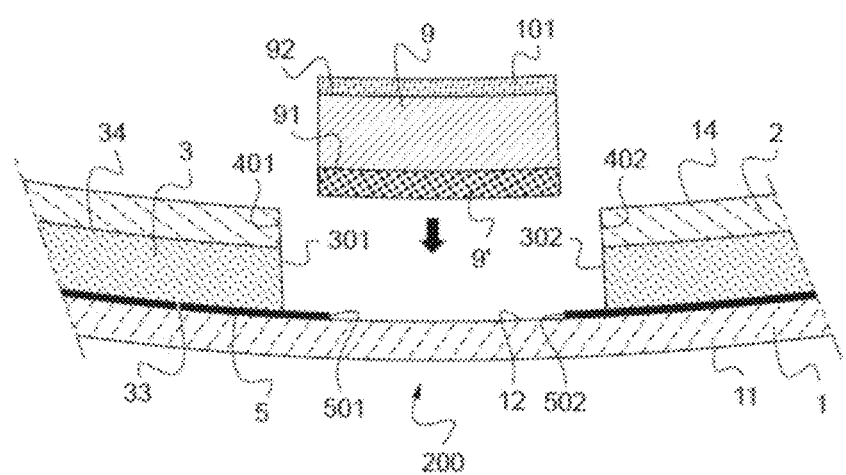

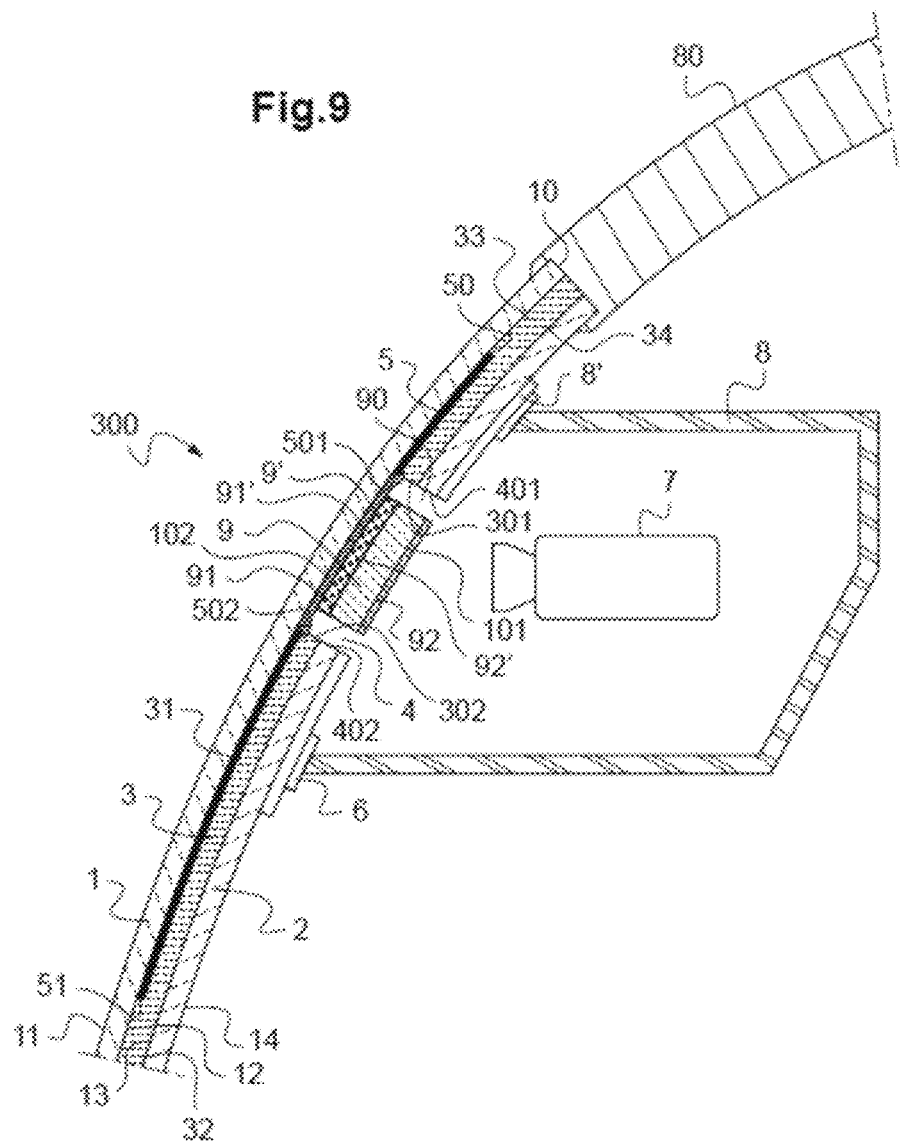

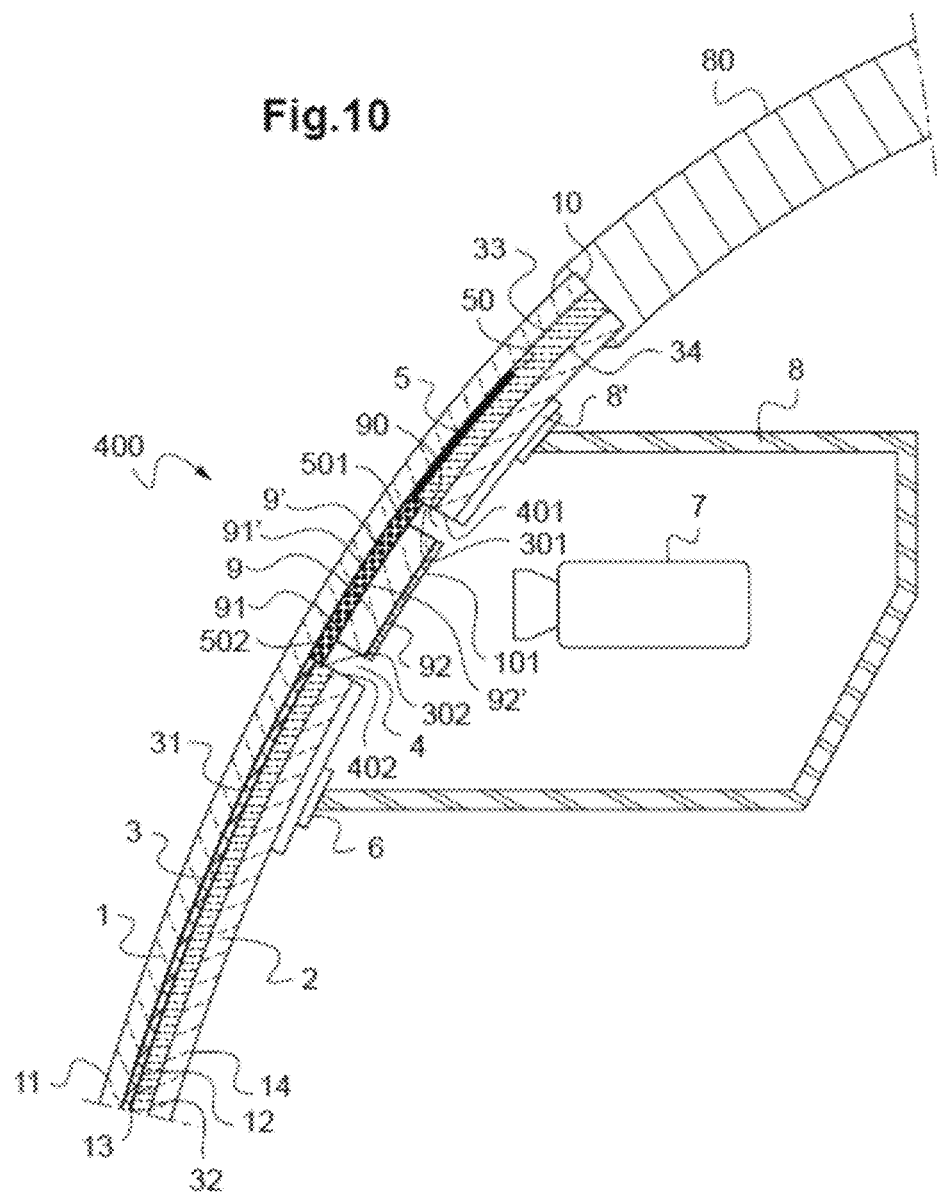

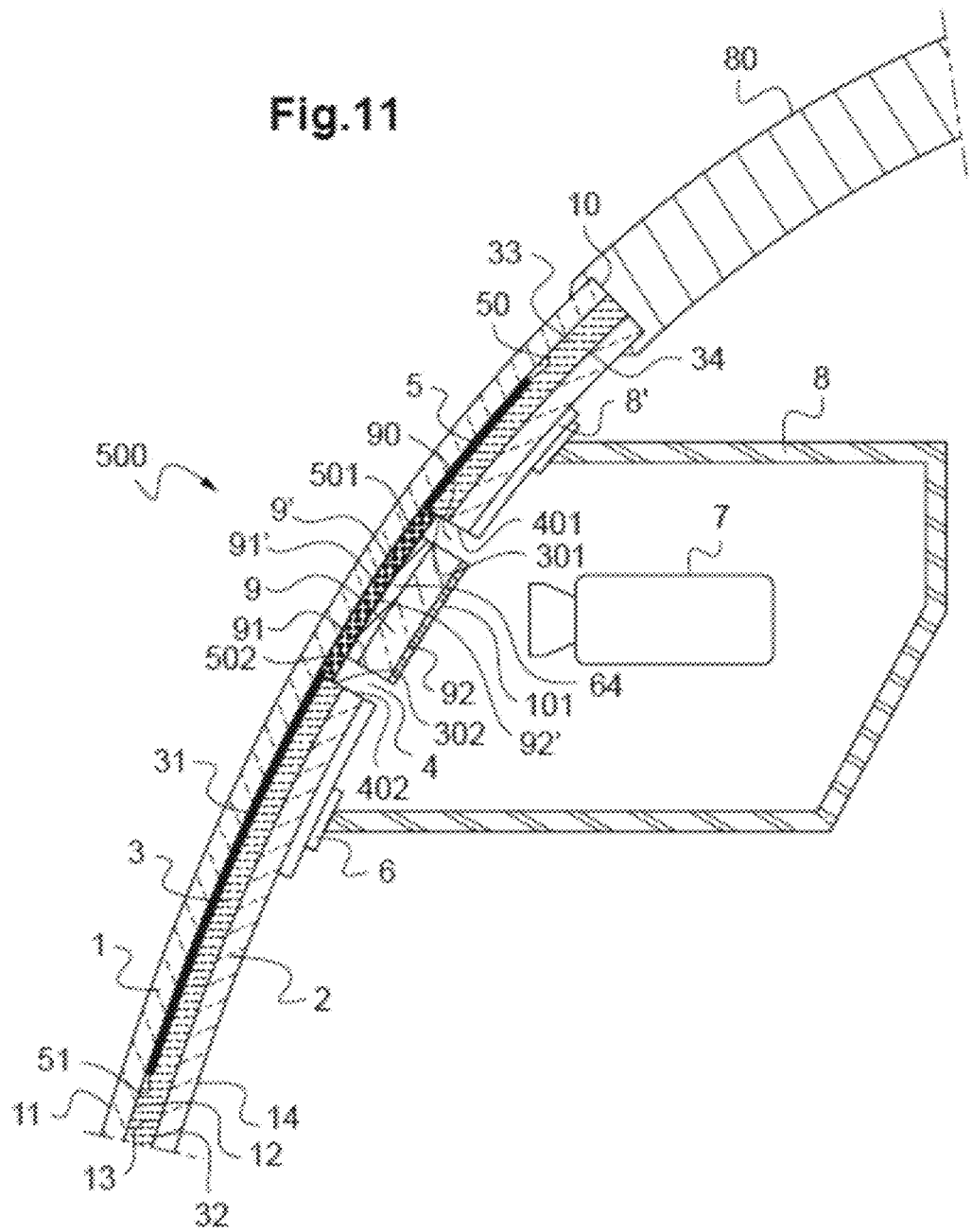

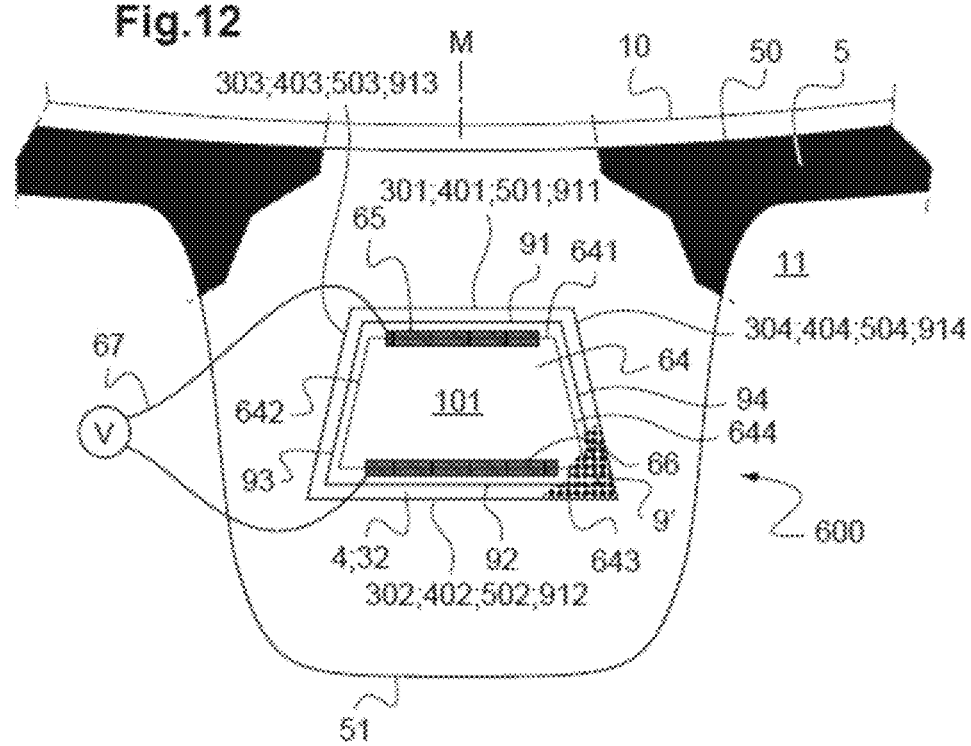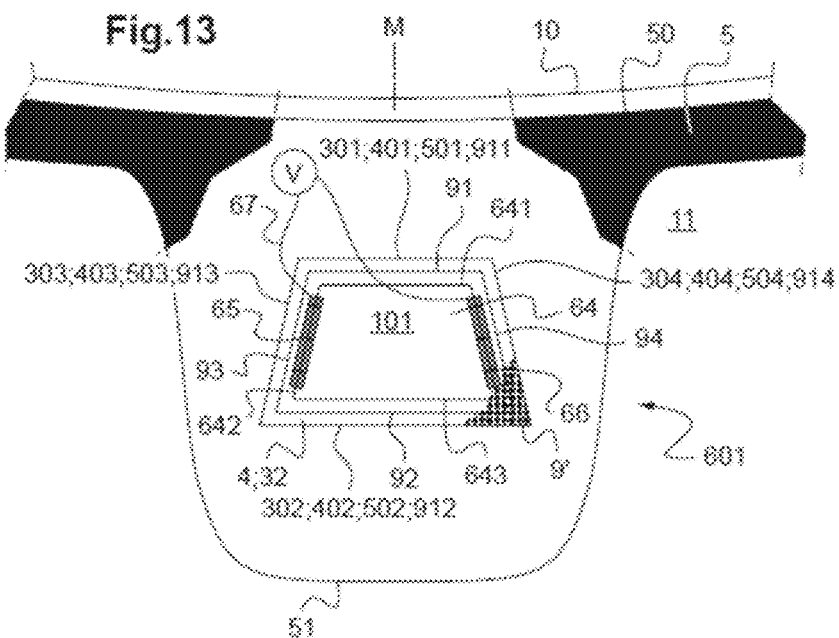

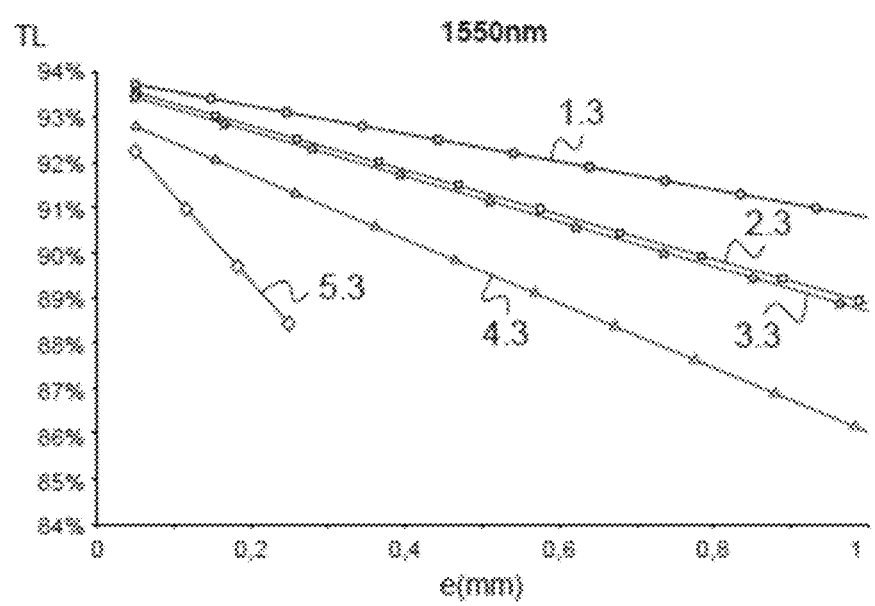

LAMINATED VEHICLE GLAZING AND DEVICE COMPRISING AN ASSOCIATED NEAR-INFRARED VISION SYSTEM

CROSS-REFERENCE TO RELATED APPLICATIONS

This application is the U.S. National Stage of PCT/FR2022/052400, filed Dec. 16, 2022, which in turn claims priority to French patent application number 2114260 filed Dec. 22, 2021. The content of these applications are incorporated herein by reference in their entireties.

The invention relates to a laminated glazed unit, in particular a windshield, in a vehicle especially a road vehicle or train, associated with a near infrared vision system. The invention likewise describes a device combining said glazed unit and the vision system.

Autonomous vehicle glazed units and the associated technology are constantly evolving, especially for improving safety.

Laser remote sensing or LIDAR (an acronym for "light detection and ranging" or "laser detection and ranging") can be used in the headlights of autonomous vehicles.

More recently, patent application WO2021/136907 proposes placing a LIDAR operating in the near infrared behind the laminated windshield including two glass sheets, a through-hole of the inner glass in a communication window for the LIDAR and a masking layer on the inner face of the outer glass.

The performance of this vision device (glazed unit associated with the LIDAR) can be improved.

To this end, the present invention first relates to a laminated (and/or curved) glazed unit of a vehicle, especially of a road vehicle (car, truck, public transport: bus, coach, etc.) or railway vehicle (particularly with a maximum speed of at most 90 km/h or at most 70 km/h, in particular subway trains, trams), especially curved, in particular a windshield, or a rear window, indeed even a side glazed unit, of a given thickness, for example sub-centimetric, especially of at most 5 mm for a road vehicle windshield, the laminated glazed unit including:
- a first glass sheet, especially curved, intended to be the exterior glazed unit, with a first main external face F1 and a second main internal face F2 oriented toward the passenger compartment, if a motor vehicle with a thickness preferably of at most 4 mm, and even of at most 3 mm or 2.5 mm—especially 2.1 mm, 1.9 mm, 1.8 mm, 1.6 mm and 1.4 mm—and preferably of at least 0.7 mm or 1 mm
- a lamination interlayer (single or multi-laminations), optionally neutral, clear, extra clear or tinted especially gray or green, made of polymer material preferably thermoplastic and better still based on polyvinyl butyral (PVB preferably containing plasticizers), preferably if a road vehicle with a thickness E0 of at most 1.8 mm, better still of at most 1.2 mm and even of at most 0.9 mm (and preferably of at least 0.3 mm and even of at least 0.6 mm), the lamination interlayer being optionally acoustic and/or optionally having a cross section decreasing in the shape of a wedge from top to bottom of the laminated glazed unit (in particular a windshield) for a head-up display (HUD), the lamination interlayer having a main face Fa oriented toward F2 and a main face Fb opposite Fa
- a second glass sheet intended to be the interior glazed unit, preferably curved and in particular tinted, with a third main face F3 on the side of F2 and a fourth main internal face F4 oriented toward the passenger compartment, if a road vehicle with a thickness preferably less than that of the first glazed unit, even of at most 3 mm or 2 mm—especially 1.9 mm, 1.8 mm, 1.6 mm and 1.4 mm—or even of at most 1.3 mm, and preferably of at least 0.7 mm, the thickness of the first and second glass sheets being preferably strictly less than 5 or 4 mm, even than 3.7 mm.

The second glass sheet, especially silica-based, soda lime-based, preferably soda-lime-silica-based, even aluminosilicate-based, or borosilicate-based, has a total iron oxide content by weight (expressed in the form $Fe_2O_3$) of at least 0.4% and preferably of at most 1.5%.

The first glass sheet, especially silica-based, soda-lime-based, soda-lime-silica-based, or aluminosilicate-based, or borosilicate-based, has a total iron oxide content by weight (expressed in the form $Fe_2O_3$) of at most 0.05% (500 ppm), preferably of at most 0.03% (300 ppm) and of at most 0.015% (150 ppm) and particularly greater than or equal to 0.005%. The redox of the first glass sheet is preferably greater than or equal to 0.15.

The glazed unit according to the invention further includes:
- a through-hole in the thickness of the second glass sheet, the through-hole being centimetric (in size) (along the surface of the second glass sheet), hole delimited by a wall, closed-off hole or opening hole (notch) (especially on a longitudinal edge), the through-hole being extended by another through-hole called the interlayer hole in the thickness of the lamination interlayer
- in the zone of the through-hole, a masking layer including a matrix (especially transparent in the visible) and a colorant agent (preferably molecular colorantcolorant), dispersed (preferably dissolved) in said matrix, masking layer (forming a selective filter) absorbing in the visible and transparent to at least one so-called working wavelength in the infrared range in a range from 800 nm to 1800 nm, in particular from 850 nm to 1600 nm, especially 905±30 nm and/or 1550±30 nm, and most particularly 1200 nm or 1400 nm at 1600 nm,
- in the through-hole and optionally under the through-hole (under the face F3)
- below flush, flush, or even above flush with the face F4-, a piece transparent at least to the working wavelength.

The piece according to the invention has:
- a main surface called the connection surface,
- and a main surface, referred to as interior surface opposite from the connecting surface, the interior surface preferably including an anti-reflective element at said working wavelength.

The masking layer forms an adhesive layer for bonding the piece to the first glass sheet, with a thickness E1.

The masking layer is especially in adhesive contact with the bonding surface which is bare or which is with a functional element (preferably functional coating, of submillimetric thickness and even of at most 200 nm) and/or is in adhesive contact with the face F2 with a functional coating (preferably of submillimetric thickness and even at most 200 nm) on the face F2. Said functional element (preferably functional coating) as said functional coating is transparent to said wavelength called the working wavelength.

According to the invention, the matrix called the crosslinked polymer is based on one or more crosslinked polymers, especially essentially consisting of crosslinked polymers, of E1 being submillimetric and even at most 850 μm or 750 μm or 650 μm.

The masking layer may be a coating (deposit) or a film (self-supporting, added), E1 is preferably greater than 50 μm (to compensate for the differences in the curvature of the first sheet and piece) and even greater than 200 μm or 500 μm.

In order to improve safety, this piece according to the invention is added in the through-hole which, so as not to adversely affect the efficiency of the LIDAR, is made of a material which is transparent at the working wavelength, preferably by virtue of an anti-reflective element with a particularly high transmission. The anti-reflective element may be an anti-reflective coating or the interior surface which is textured (surface treatment etc.), especially nano-textured.

Furthermore, an interlayer hole is produced because the conventional lamination interlayer of very thick PVB to satisfy the usual mechanical criteria on the glazed unit, typically PVB film of 0.7 mm or more, but not transparent enough to the working wavelength, in particular from 1200 nm.

By making a crosslinked polymer layer, which can have a very high transparency at the working wavelength, generally greater than that of the thermoplastic, it is possible to functionalize it for masking and fixing the piece.

Surprisingly, the addition of coloring agents (pigment or preferably "chemical" colorant or molecular colorant called "colorant") does not disturb the bonding power or the mechanical strength of the masking layer.

The thickness E1 is chosen to have sufficient transparency while having acceptable mechanical performance. The crosslinked polymer matrix is more transparent than a thermoplastic matrix at the working wavelength; it is possible to have a greater thickness for the same transparency.

The masking layer can have a shape, for example homothetic to that of the section of the through-hole, therefore for example trapezoidal, or alternatively has alternatively another shape to that of the section of the through-hole 4, for example of rectangular shape.

In particular, the difference in absolute value between E0 and E1 is at most 300 μm or 200 μm or 100 μm, (in particular E0 is at least 0.6 mm and preferably at most 1.2 mm or even at most 0.9 mm) and optionally E1 is less than E0.

Preferably, for a crosslinked polymer matrix, a thickness E1 of at least 300 μm is chosen, especially from 300 μm to 500 μm if E0 is from 0.3 mm±0.1 mm or especially from 400 or 500 μm to 800 μm if E0 is 0.7 mm±0.1 mm.

The invention is particularly suitable for glazed units (windshield, window, etc.) for road vehicles, especially autonomous or semi-autonomous ones: levels L2+, L3, L4 and L5 ("fully" autonomous) as well as vehicles such as Robot Taxis and shuttles, etc.

The angle of the glazed unit, especially a windshield of a road vehicle, can typically be between 21° and 36° with respect to the ground and on average 30°.

In particular, the through-hole opens out onto said upper longitudinal edge or edge face or is closed off (surrounded by the glass wall of the second sheet), especially in the vicinity of the upper longitudinal edge face.

According to the invention, "based on" of an element at least 50% by weight of the element in question in a given composition.

The masking layer may contain one or more components of black, cyan, magenta or yellow coloring agent.

The masking layer may contain any pigment or any molecular colorant having a higher infrared transmittance than its visible transmittance. The masking layer may include molecular colorant (soluble in matrix) or pigments or both.

The coloring agent typically represents between 0.1 and 10% by weight of the masking layer.

Preferably, a preferably black molecular colorant (with a black masking layer, defined below) is chosen and defined by a highest possible absorption coefficient at the working wavelength to minimize the concentration (at a given layer thickness).

For example, the masking layer may contain as a colorant:
colorants such as inks from family 7527 (Epolin, Newark, NJ); 7527A or 7527B or 7527C.
colorants such as Sudan Black BR or Nigrosin Solvent Black 5,
colorants such as Spectre™ inks, for example Spectre™ 100, 110, 120, 130, 140, 150, or 160 (Epolin); Mimaki inks, for example Mimaki ES3, SS21, BS3, SS2, or HS (Mimaki); or Seiko inks, for example Seiko 1000, 1300, SG700, SG740, or VIC (Seiko Advance Ltd.) or else IR9508 black ink from MingBo anti Forgery Technology Co ltd.
colorants such as Lumogen® Black FK 4280 or Lumogen® Black FK 4281, or Lumogen black K0087 (for a working wavelength >850 nm) or Paliogen black L086 (for a working wavelength >780 nm) or Paliogen black S0084 (for a working wavelength >730 nm) from BASF.

For the masking layer, the layer thickness and/or the weight percentage of coloring agent can be varied.

The finer the masking layer, the greater the concentration (wt %) of colorants (and therefore the weight % of the matrix is lowered).

The infrared transmission desired for the masking layer is advantageously at least 88% or 90% between 1200 nm and 1600 nm.

The light transmission (TL) desired for the masking layer is advantageously at most 3% and even at most 2% in the visible. The concentration C1m of colorant (preferably molecular colorant) which makes up the masking layer can be defined by the Beer-Lambert law from the absorptivity coefficient $\varepsilon$ (in $L \cdot g^{-1} \cdot cm^{-1}$) or else the molar extinction coefficient $\varepsilon$, also called the molar absorption coefficient (in $mol \cdot g^{-1} \cdot cm^{-1}$) according to the relationship:

$$A_{\lambda max} = -\log(T_{\lambda max}) \qquad [\text{Math 1}]$$

or:

$$A\lambda max = \varepsilon \times E1 \times C1m \qquad [\text{Math 2}]$$

Where $A_{\lambda max}$ is absorbance, $T_{\lambda max}$ is the transmission taken at the position of the absorption maximum of the colorant to be reached in order to have a light transmission TL of at most 3% or 2% in the visible, and C1m is the corresponding minimum colorant concentration in the masking layer.

Then, C1m (in g/L or in %) can then be deduced according to the following general relationship:

$$C1m = \frac{-\log(T_{\lambda max})}{\varepsilon \times E1} \qquad [\text{Math 3}]$$

More specifically for the colorant N7527B:
$\lambda max=603$ nm, $\varepsilon=175.6$ $L \cdot g^{-1} \cdot cm^{-1}$, $T_{\lambda max}=10.49 \cdot 10^{-3}$ u.a. for TL equal to 3% or $T_{\lambda max}=5.96 \ 10^{-3}$ u.a. for TL equal to 2%, And therefore, for TL=2%, we obtain:

$$C1m = \frac{-\log(5.96*10^{-3})}{175.6 \times E1} \quad \text{[Math 4]}$$

And therefore, for TL=3%, we obtain:

$$C1m = \frac{-\log(10.49*10^{(-3)})}{175.6 \times E1} \quad \text{[Math 5]}$$

The following two tables each give the minimum concentration of this colorant N7527B (in g/L, absolute amount of colorant, or % by weight of layer) in the case of a crosslinked polymer matrix, for example OCA acrylate. The thickness E1 of said (crosslinked) masking layer (coating or film) is preferably in the range from 5 µm to 950 µm and even from 450 µm to 850 µm or 750 µm if it is desired to increase the transmission at the working wavelength especially by at least 1200 nm. The lower colorant concentrations do not make it possible to reach a TL=2% or 3%, respectively.

TABLE 1

| E1 (µm) | C1 m (g/L) TL = 3% | C1 m (%) TL = 3% |
|---|---|---|
| 5 | 22.54 | 2.209 |
| 50 | 2.25 | 0.225 |
| 250 | 0.45 | 0.045 |
| 450 | 0.25 | 0.025 |
| 650 | 0.17 | 0.017 |
| 750 | 0.15 | 0.015 |
| 850 | 0.13 | 0.013 |
| 950 | 0.12 | 0.012 |

TABLE 2

| E1 (µm) | C1 m (g/L) TL = 2% | C1 m (%) TL = 2% |
|---|---|---|
| 5 | 25.55 | 2.497 |
| 50 | 2.56 | 0.255 |
| 250 | 0.51 | 0.051 |
| 450 | 0.28 | 0.028 |
| 650 | 0.20 | 0.020 |
| 750 | 0.17 | 0.017 |
| 850 | 0.15 | 0.015 |
| 950 | 0.13 | 0.013 |

The masking layer with the crosslinked polymer matrix may comprise other additives (preferably less than 10 or 5 or 1% by weight of layer) such as at least one of the following:
residual photoinitiators,
plasticizers (for greater flexibility)
adhesion promoters
additives for durability The degree of polymerization or even crosslinking is not necessarily 100%, the matrix can therefore include residual prepolymers, monomers, oligomers. NMR (Nuclear Magnetic Resonance) can be used to analyze the masking layer after crosslinking in order to determine the degree of polymerization. It is possible to have a mixture of polymers.

The crosslinked polymer matrix may be a crosslinked (clear) Optical Adhesive (especially called OCA for Optical Clear Adhesive). The optical adhesive (OCA) may be deposited in the solid state, or in the liquid state and hardened before during or after the lamination process. The way in which the liquid OCA cures depends on its nature, with some OCAs crosslinking especially by energy supply of the ultraviolet type, and others crosslinking at ambient temperature with the addition of a curing agent.

The crosslinked polymer matrix may preferably be based (or essentially composed of) the following materials: acrylate, especially urethane acrylate, polyvinyl acetate, polyurethane, silicone or epoxy.

The layer may be a coating obtained by the liquid route and obtained from a formulation, preferably UV-photocrosslinkable (UVA) or even bi-component formulation.

UV (A) crosslinking is preferred since crosslinking is faster.

The masking layer may be a polymer film which is crosslinked, in particular a pressure-sensitive adhesive (PSA), which adheres by simple contact, in particular the following materials: acrylate, especially urethane acrylate, polyvinyl acetate, polyurethane, silicone, etc.

A pressure-sensitive adhesive, abbreviated to PSA and commonly called self-adhesive, is an adhesive which forms a bond when a pressure is applied to it, so as to render the adhesive integral with the surface to be adhesively bonded. No solvent or water or heat is necessary to activate the adhesive.

As its name shows it to be "pressure-sensitive", the degree of bonding between a given surface and the self-adhesive binder is influenced by the amount of pressure used to apply the adhesive to the target surface.

PSAs are generally designed to form a bond and to maintain the latter at ambient temperature. A person skilled in the art will choose a self-adhesive formulation suited to the conditions of its use. This is because PSAs generally experience a reduction in or disappearance of their adhesion at low temperature and experience a reduction in their ability to withstand shearing at elevated temperatures.

PSAs are generally based on elastomer coupled with an appropriate additional adhesive agent or "tackifying" agent (for example an ester resin).

The elastomers can preferably be based:
on acrylates, which may be sufficiently tacky not to require an additional tackifying agent.
on silicone, requiring special tackifying agents such as "MQ"-type silicate resins, composed of monofunctional ("M") trimethylsilane which has reacted with quadrifunctional ("Q") silicon tetrachloride, silicone-based PSAs are for example gums and resins of polydimethylsiloxane dispersed in xylene or a mixture of xylene and toluene.
or optionally:
on block copolymers based on styrene, such as styrene-butadiene-styrene (SBS), styrene-ethylene/butylene-styrene (SEBS), styrene-ethylene/propylene (SEP) or styrene-isoprene-styrene (SIS) block copolymers,
on vinyl ethers.
on nitriles.

Preferably, the masking layer is a crosslinked pressure-sensitive polymer film whose crosslinked polymer matrix is preferably based on acrylate or silicone (crosslinked).

PSA adhesives are sold in the form of double-sided adhesive rolls. Mention may be made, as PSAs based on silicone, of the Dow Corning® adhesives, such as 2013 Adhesive, 7657 Adhesive, Q2-7735 Adhesive, Q2-7406 Adhesive, Q2-7566 Adhesive, 7355 Adhesive, 7358 Adhesive, 280A Adhesive, 282 Adhesive, 7651 Adhesive, 7652 Adhesive, 7356 Adhesive.

Mention may also be made of a film

In the case of a crosslinked polymer film, the piece and the film are for example preassembled.

The masking layer with the crosslinked polymer matrix may include or even be (essentially) a self-supporting adhesive film, preferably pressure-sensitive, mono-(single-layer film made of material preferably with said crosslinked polymer matrix) or multi-layer, E1 preferably of at most 850 µm or 750 µm and better still at least 450 µm. The crosslinked polymer matrix is for example based on acrylate, preferably photocrosslinked by ultraviolet.

The masking layer may include or even be a polymer substrate carrying a thickness (E'0 submillimetric) on its main faces of a masking adhesive layer made of crosslinked polymer (thickness E11 and E12), with E1 or at least E11+E12 preferably of at most 850 µm or 750 µm and better still of at least 450 µm, especially pressure-sensitive masking adhesive layers. The crosslinked polymer matrix of the two masking adhesive layers is for example based on acrylate preferably photocrosslinked by ultraviolet.

In the case of a crosslinked polymer coating, the crosslinkable composition (UV) for the coating can be deposited on the piece before lamination, and preferably crosslink or finish its crosslinking during the lamination and/or after lamination.

In a first example of a masking layer in the form of a coating, the product called OCA UZ181A is used, which is an acrylate-based crosslinkable UV resin sold by AK ChemTech in which a black molecular colorant is diluted, namely N7527B of Epolin.

In a second example of a masking layer in the form of a coating, the product called OCA Uvekol S15 is used, which is a single-component acrylate-based (urethane acrylate) crosslinkable UV resin sold by Allnex in which a black molecular colorant is diluted, namely N7527B of Epolin.

In a third example of a masking layer in the form of a coating, the product called OCA Loctite AD8650 is used, which is a silicone-based crosslinkable UV resin sold by Henkel wherein a black molecular colorant is diluted, namely N7527B of Epolin.

OCA Uvekol S15 is preferred since it is less toxic than OCA UZ181A, with a satisfactory transparency in particular from 1200 nm especially around 1550 nm.

Preference is given to a crosslinked polymer matrix without a Carcinogenic, Mutagenic and Reprotoxic (CMR) agent OCA Loctite AD8650 is less good in mechanical performance than both of the other OCAs.

In general, a PVB-based interlayer sheet comprises from 70% to 75% PVB, 25 to 30% plasticizer and less than 1% additives. There are also PVB sheets with little or no plasticizer such as the "MOWITAL LP BF" film from KURARAY without plasticizers.

The transparency at the working wavelength especially at 1550 nm can be better by lowering the level of PVB by adding plasticizers or other additives transparent to the working wavelength.

However, absorption at the working wavelength may also vary depending on the nature of the main polymer chain (molar mass, crystallinity level, tacticity, etc.), potential grafted functions or other absorbent additives.

The masking layer in the form of a coating may be deposited (by liquid route) on the piece (bare or with a functional element) or on the face F2 (bare or with a functional element) before or after assembly (before the lamination preferably).

For the manufacture, crosslinkable adhesives, crosslinkable adhesives which cure when their components react (especially under ultraviolet, thermo-crosslinkable, etc.) or when a solvent evaporates can be used. In all cases, there is a chemical reaction in order to create chemical bonds for the crosslinking, in which case the crosslinked polymer is defined by the formation of a 3D network of polymer chains bound by chemical bonds.

The manufacture of the laminated glazed unit according to the invention may comprise, for the formation of the masking layer, the deposition of OCA (thermocrosslinkable) by the liquid route on the face F2 before lamination (before assembly or not), it is preferable to use a heat-crosslinkable OCA which crosslinks owing to the temperature applied during the lamination.

The manufacture of the laminated glazed unit according to the invention may comprise, for the formation of the masking layer, the OCA deposition in the hole advantageously after lamination or else on the piece which is then placed on the face F2 after lamination. Use is then made of an OCA crosslinkable by UV, or two-component crosslinkable by chemical reaction. If the OCA is deposited on the surface of the piece, a step of pre-crosslinking (UV or advancing the chemical reaction) is advantageous in order to gel the OCA at the surface of the piece and be able to deposit it in the hole. A vacuum is then created in order to evacuate the trapped air and complete the crosslinking in order to obtain good adhesion.

Preferably, the masking layer has a clarity $L^*1$ of less than 5 and even equal to 1.

Preferably, the glazed unit includes an opaque masking layer, absorbing in the visible at the working wavelength, especially in the form of at least one coating on at least one of the first or second sheets and/or on the lamination interlayer; peripheral and in the region of said through-hole, the masking layer having a gap in line with said (first) through-hole at least in the central zone and preferably exceeds at most 50 mm, 30 mm or 20 mm or 10 mm, 7 mm or 5 mm in said through-hole.

At the edge of the through-hole, the masking layer may be on the opaque masking layer with a covering preferably over at most 50 mm, or is contiguous, or offset by at most 150 µm.

The masking layer preferably has substantially the same color (black etc.) and/or optical density as the peripheral opaque masking layer (black etc.). For example, the optical density difference between the masking layer and the opaque masking layer is at most 5%, 3%, 2% and they are even the same color.

It is therefore possible to provide different extents for the masking layer under face F3 and especially spaced apart from the piece:

The masking layer extends under face F3 beyond said through-hole, extending a peripheral masking layer or masking a gap of a peripheral masking layer, The masking layer can have at least one local opening or discontinuity in order to allow the light rays to pass through, especially for at least one additional sensor, in particular a sensor of a visible-light camera or thermal camera, in particular a camera secured to a plate on the face F4 perforated to allow said light or electromagnetic rays (thermal camera) to pass through.

The glazed unit can include, between face F2 and Fa, an opaque masking layer especially an enamel (black etc.) on face F2 and/or on face Fa (in particular on Fa an ink, especially black, etc.), at the edge of the through-hole between face F2 and Fa, in particular on the peripheral zone and even central and preferably along the longitudinal edge of the glazed unit.

The opaque masking layer is preferably a continuous layer (flattened with a solid edge or alternatively a gradient edge (set of patterns).

The masking layer can be at 2 mm or 3 mm (less than 5 mm) from the edge face of the glazed unit (closest).

The masking layer can be a band framing the glazed unit (windshield etc.) especially in black enamel. A gap is thus created in this masking layer.

The masking layer can then have a gap in line with said through-hole (at least in the central zone) and preferably which protrudes by at most 50 mm, 30 mm or 20 mm or 10 mm, 7 mm or 5 mm in said through-hole.

This masking layer masks the infrared vision system and/or for example its casing.

A masking layer may be a printed layer on the lamination interlayer for example on the PVB.

Another masking layer (especially black enamel etc.) can be on face F3 or F4 particularly facing toward the masking layer (and even of identical nature, for example an enamel especially black).

The masking layer may be defined by a L*1 (as already seen) and also by a*1 b*1, defined in the L*a*b*CIE 1976 color space. The peripheral opaque masking layer (of color C1) is also defined by a L*2, a*2 b*2 with a color difference ΔE* given by the following formula $$\Delta E^* = \sqrt{(\Delta L^{*2} + \Delta a^{*2} + \Delta b^{*2})}.$$

Preferably, ΔE*<4, better still ΔE*<2 (discerned with difficulty by the human eye), even better still ΔE*<1 (not discerned by the human eye).

The masking layer can replace all or part of the opaque enamel (on face F2 and/or F3 and/or F4) or the ink printed on the lamination interlayer traditionally used at least in the region of the through-hole or of several through-holes.

In one embodiment, the layer for masking and the masking layer are optionally in separate planes and are outside the through-hole:
they are contiguous in the sense that their edge faces (those in the vicinity of the through-hole) are aligned, or even their main faces may face one another in part (lateral coverage over at most 50 mm)
or are offset (the edge faces are offset, without contiguousness or coverage) by at most 100 μm in order maintain this visual impression of a continuous opaque (black) strip.

In particular, the edge face of the masking layer is spaced apart (laterally) by at most 100 μm from the gap in order not to see the interruption in opaqueness with the naked eye, and the edge face of the masking layer forming the edge of the gap is spaced apart (laterally) by at most 500 μm from the wall of the through-hole, if it is desired to limit the extent of the masking layer.

In the specific case in which the masking layer is an ink deposited (printed) on the lamination interlayer (PVB), it may be preferred for the ink to be spaced apart from the edge of said through-hole by at least 1 cm in order to prevent delamination.

In the specific case in which the masking layer is an ink deposited (printed) on the lamination interlayer (PVB), it may be preferred for the ink to be spaced apart from the edge of said through-hole by at least 1 cm in order to prevent delamination.

In particular, the masking layer is a coating on face F2 and is covered by the masking layer especially coverage over at most 50 mm.

In particular, the masking layer is a coating on face F2 or on the piece and the masking layer is on one of faces FA or FB, especially covering (projecting over) at most 50 mm.

In particular, the masking layer is a coating on F2 or on the piece, and the masking layer is on face F3 or F4, especially covering (projecting over) at most 50 mm.

In particular, the masking layer is a film (PSA) on F2 or on the piece, and the masking layer is on the face F2 or F3 or F4 or on one of the faces FA or FB, especially covering (projecting over) at most 50 mm.

The masking layer can be in the region including the (first) through-hole (taking up a fraction of the glazed unit surface) and take up less than 30%, 10%, 5% of the glazed unit.

The masking layer can have any general shape: rectangular, square, identical and even homothetic to the shape of the (first) through-hole.

The distance between the upper longitudinal edge and the masking layer can be at most 30 mm, 20 mm 15 mm and even 10 mm.

The masking layer (coating, film) is for example local with a given surface area S0 and the orthogonal projection of the surface S0 on the second sheet encompasses at least the section Sc of the through-hole or at least 0.9 Sc. For example, S0 ranges from 0.9 Sc to 1.2 Sc. S0 may be smaller than Sc, especially if an opaque masking layer overhangs under the (first) through-hole (at the periphery).

The masking layer under the (first) through-hole may be more extensive than the (first) through-hole, for example to hide one or more other sensors as detailed later. The masking layer can protrude beyond the (first) through-hole for example by at most 50 mm or better still by at most 20 mm between face F2 and face F3 in a (glazed) zone, referred to as edge zone, of said hole and have a different shape for the masking layer and the (first) through-hole, for example.

In the first local configuration, the masking layer is located in the zone of the (first) through-hole (without extending under the face F3), covering the face F2 especially the masking layer is in contact with the inner wall of the interlayer hole or spaced from the inner wall of the interlayer hole by a distance of at most 3 mm or 1 mm.

In the second local configuration (a sub-case of the first), the masking layer is located under the piece or even extends beyond the piece by at most 0.1 mm without extending under the face F3, in particular the masking layer is spaced from the inner wall of the interlayer hole (by a distance preferably of at most 3 mm) and/or the piece is spaced apart from the wall of the (first) through-hole by a distance of at least 0.3 mm and at most 3 mm.

In the third extended configuration (an alternative to others), the masking layer extends beyond the zone of the through-hole under the second glass sheet, referred to as the first through-hole of the second sheet and optionally in a zone devoid of the lamination interlayer (the interlayer hole then being wider than the (first) through-hole of the second sheet).

In particular, the laminated glazed unit includes a second through-hole of the second glass sheet under the first through-hole, especially separated by a hole-to-hole distance of at least 8 cm, a second through-hole having another piece (especially of the same nature, for example in glass, as said piece) transparent to the working wavelength and the interlayer hole extends between the first and second through-holes and in the zone of the second through-hole, the masking layer extends in the zone of the second through-hole and forms an adhesive layer joining the other piece to the first glass sheet.

The glazed unit then comprises an (the) opaque masking layer which absorbs in the visible at the working wavelength, especially in the form of at least one coating on at least one of the first or second sheets and/or on the lamination interlayer; peripheral and in the region of said through-hole, the masking layer having a gap in line with said first through-hole and in line with the second through-hole and the gap extends between the first and second through-holes (gap filled or substantially filled with the masking layer).

If there is a second through-hole under the first through-hole (as described), the masking layer can be local and split (the masking layer is in two separate zones in line with the two through-holes) as per the first or second configuration.

For Example:
said first through-hole is opening, and the second through-hole is closed.
both holes are closed.

The first and second holes may be of similar size. The (first) opening or closed through-hole may have a constant or variable (cross) section Sc, especially trapezoidal or rectangular or disk-shaped or oval, is for example smaller (in diameter or vertically) by at least 2 cm, 3 cm, 5 cm and preferably larger (especially horizontally) by at most 30 cm or 25 cm or 20 cm. And preferably, the interlayer hole has a surface section S'c, especially trapezoidal or rectangular or disc or oval, with a smaller dimension of at least 3 cm and/or larger dimension of at most 20 cm homothetic or not to Sc.

For example, the first through-hole faces the receiver of the LIDAR, and the second through-hole faces the transmitter of the LIDAR.

As already stated, the masking layer can cover the zones facing the 2 through-holes and in a zone devoid of the interlayer. The masking layer then also serves to bond the first and second glass sheets.

Preferably, under in said through-hole, the laminated glazed unit includes:
at most one functional polymer film (with or without coating on one or two faces), including the masking layer if film chosen
and/or at most two or a functional coating distinct from the masking layer if coating chosen In one embodiment, under said through-hole, the laminated glazed unit is
free of any functional polymer film (with or without coating on one or two faces) distinct from the masking layer if film chosen
and even includes at most one functional coating separate from the masking layer if coating chosen The piece according to the invention has a thickness of preferably at least 0.3 mm and even at least 0.7 mm and preferably at most 3 mm, especially the piece has a size (width and/or surface area) which is less than the through-hole, which piece has an edge face in contact with or spaced apart from the wall delimiting the through-hole by preferably at most 5 mm, preferably spaced apart and by a distance of at most 2 mm and even ranging from 0.3 to 2 mm.

The piece according to the invention is for example made of a polymer material (preferably at least 90% or even 95% or 100% by weight of polymer, optionally loaded with organic or inorganic additives or reinforced with organic or inorganic fibers).

The piece according to the invention is for example made of mineral material (especially glass or glass-ceramic material).

At least a fraction of the thickness of the piece (for example at least 0.3 mm) is in the through-hole, and even the thickness of the piece is in the through-hole.

The bonding surface is preferably provided below flush with the face F3 or flush with the face F3 or above flush with the face F3 (in the hole), and/or the interior surface being below flush (in the through-hole), or even above flush with the face F4.

The piece may be spaced apart from the wall by a distance of at least 0.3 mm and of at most 3 mm.

It is preferred for the piece to be spaced apart (empty or filled space), but not too much, to retain its safety function.

The piece may be curved (convex), following the curvature of the first glass sheet.

This piece (polymer, etc.) can be curved by molding.

In one embodiment, this piece is flexible and is curved following the curvature of the first glass sheet for example during the assembly before lamination (and after the bending of the first and second glass sheets).

Before lamination (before assembly), the piece may have undergone a heat treatment (at a lower temperature than during the bending of the glass sheets) to form an anti-reflective coating. For example, this is a coating (sol-gel silica precursor with pore-forming agent) which is heat treated (to eliminate the pore-forming agent) to have the anti-reflective function, for example to form nanopores.

The piece according to the invention may be polymer. It preferably includes at least 90% or 95 or 99% or 100% by weight of polymer material.

The piece, especially of at least 1 mm and/or of at least 50% or 80% of the thickness of the second glass sheet, may in particular be polycarbonate PC, polymethyl methacrylate PMMA or even polyester, in particularly polyethylene terephthalate PET.

The piece may include an adhesion primer layer on the face F2 to promote the adhesion of the masking layer onto the piece. And/or the face F2 may include an adhesion primer layer (forming said functional coating), in order to promote the adhesion of the masking layer to the first glass sheet.

As an example, there are primary, bi- or tri-component adhesion primer layers (especially for glass), for example based on polyurethane, polyester, polyvinyl acetate, isocyanate, etc., a thick layer of 5 to 30 μm. It may be useful for managing glass adhesion. The use of a primer is a function of the polymer matrix used.

The space between the piece and the wall can be filled fully or in part (or not) with a filling material (organic and/or inorganic), optionally adhesive (especially resin, especially crosslinked polymer, single-component or two-component, for example two-component polyurethane, epoxy, acrylate etc.). The thickness of this material is for example less than the thickness of the second sheet and/or of the piece.

It may be a material identical or similar to that for the crosslinked matrix of the masking layer according to the invention.

The glazed unit may include an insert between the wall of the through-hole and the piece, especially a closed insert if the through-hole is closed. An insert (annular, of ring type, etc.), for example made of flexible polymer material (polycarbonate etc.) may be housed in, mounted on (especially adhesively bonded or force-fitted) to the wall of the second glass sheet:

to serve as mechanical reinforcer, and/or for the attachment of a piece or an optical module between the piece and the infrared vision system (LIDAR), this insert being able to extend beyond the through-hole, especially on face F4.

The insert according to the invention is preferably spaced apart from the infrared vision system (LIDAR) and does not serve for the attachment of same.

The (first) through-hole is for example closed (as opposed to opening, such as a cavity made in the edge face of the second sheet), especially spaced apart from the edge face of the second sheet by at least 2 cm, 5 cm, 10 cm or even more.

The (first) through-hole is preferably in a peripheral region, preferably the upper part of the glazed unit (in mounted position), and even in a peripheral central region. The (first) through-hole is in particular located in one region and take up less than 10% or even less than 1% of the glazed unit. For example the lower edge of the (first) through-hole is at most separated by 50 cm from the upper longitudinal edge face of the glazed unit.

The (first) through-hole can be:
- closed hole (surrounded by the wall of the second glass sheet), therefore within the glazed unit especially spaced apart from the closest edge face of the glazed unit by at least 3 cm or 5 cm
- open or opening, forming a notch (peripheral).

The shape and dimensions of the (first) through-hole are configured according to the techniques of the art in order to effectively and -ly collect all the radiation passing through the glazed unit (windshield, window, etc.), especially in the case of LIDAR those reflected from a solid angle range outside the vehicle and coming from the area in front of the vehicle that is to be captured via the LIDAR.

The (first) through-hole (and even the second hole) may have rounded corners.

If the (first) through-hole is a notch, part of this notch will be masked by the frame of the glazed unit and thus non-functional for the infrared vision system. If the (first) hole is closed it is too close to the edge and the same occurs.

If the (first) through-hole is closed, the edge of the through-hole closest to the edge face of the glazed unit (preferably upper longitudinal edge and especially in a central zone) is spaced apart from this edge face of the glazed unit (of the second sheet) preferably by at least 2 cm or 3 cm and better still 5 cm.

The (first) through-hole can be in the central zone of the upper longitudinal edge of the windshield, the usual zone of the interior rearview mirror (rearview mirror adjacent to the through-hole or rearview mirror eliminated depending on the vehicle), zone where a masking layer on face F2 and/or connected to the interlayer is generally wider than on the adjacent lateral zones along the upper longitudinal edge (passenger, driver, etc.).

The (first) through-hole (and even the second hole) is preferably longer than it is high.

Preferably, the (first) through-hole has a horizontal dimension, referred to as length L1 (parallel to the upper longitudinal edge) and a vertical dimension of the hole, referred to as height H1 (perpendicular to the upper longitudinal edge), the length L1 is greater than the height H1.

In particular, the section of the (first) hole (and even of the second hole) is a quadrilateral, especially a rectangle or trapezoid, with:

- a first (large) "upper" longitudinal side (closest to the edge face of the upper longitudinal edge of the glazed unit) of length L1a preferably of at most 30 cm, 20 cm, or 15 cm or 12 cm
- a second (large) "lower" longitudinal side (farthest from the edge face of the upper longitudinal edge of the glazed unit, closer to the central zone) preferably parallel to the edge face of the upper longitudinal edge of the glazed unit and of a length L1b preferably of at most 35 cm or 30 cm or 25 cm or 20 cm and preferably larger than that of the first large side
- a height (between these first and second large sides) preferably of at least 5 cm and even of at most 15 cm.

If the (first) hole is closed, the first (large) "upper" longitudinal side is preferably parallel to the edge face of the upper longitudinal edge of the glazed unit and especially spaced apart by at least 5 cm or 6 cm from the edge face (of the upper longitudinal edge of the glazed unit).

If the (first) hole is open (notch), the first (large) "upper" longitudinal side is preferably defined as the upper edge of the emptied zone.

A central line M is defined passing through the middle of the upper edge which can be an axis of symmetry of the glazed unit. The (first) through-hole can be central, then the line M passes through the through-hole and divides it into two, especially identical, parts.

Preferably, facing said through-hole, the laminated glazed unit (first sheet/(functional element)/masking connecting layer/(functional coating)/piece/(antireflective element preferably (antireflective coating or textured surface) has:

- a total transmission of at most 10.0%, 5.0%, or 2% or 1.0% or 0.5% in the visible range (especially at least at a reference value in a range from 400 to 700 nm or in the whole range extending from 400 to 700 nm) measured at 90° or even preferably also at 60° or even to 60° on the face F1 side,
- preferably retaining a total transmission of at least 90.0%, 91.0%, or even 92% or 93% at the working wavelength, especially 905±30 nm and/or 1550±30 nm, especially measured at the normal) (90° or even preferably also at 60° or even up to 60° with respect to the (local) plane of the piece, for example on the optional anti-reflective element side.

The total infrared transmission is measured for example with a spectrophotometer such as the lambda 900 from Perkin Elmer.

Preferably, before assembly, the piece with said anti-reflective element (anti-reflective coating or textured surface) has a total transmission of at least 90%, 91.0%, 92.0%, or even 93.0% or 95% at the working wavelength, especially 905±30 nm and/or 1550±30 nm, especially measured at the normal) (90° or even preferably also at 60° or even up to 60° with respect to the (local) plane of the piece, for example on the anti-reflective element side, and even if use is made of a multi-spectral vision system, the piece with said anti-reflective element (anti-reflective coating or textured surface) has a total transmission of at least 91%, 92%, or even 93% at another working wavelength in the visible range, especially between 400 nm and 700 nm, especially measured at the normal or even preferably from 90° to 60°, with respect to the plane of the piece, for example on the anti-reflective element side.

In order to quantify the transmission of the glass in the visible range, a light transmission factor, referred to as light transmission, is often defined, often abbreviated to "$T_L$", calculated between 380 and 780 nm and applied to a glass thickness of 3.2 mm or 4 mm, according to ISO standard 9050:2003, thus taking into account the illuminant D65 as defined by ISO/CIE standard 10526 and the C.I.E 1931 standard colorimetric observer as defined by ISO/CIE standard 10527.

Naturally, the light transmission $T_L$ of the laminated glazed unit in a zone without a hole (central zone of the windshield) is preferably of at least 70% or 75%, 80% or 85%, 88%.

Preferably, the anti-reflective element includes, or even consists of, an anti-reflective coating on the interior surface.

In particular, the anti-reflective coating can comprise, or even consists of, a stack of thin dielectric layers (of oxide and/or of metal or silicon nitrides, for example) alternating high and low refractive indices at the working wavelength, especially a stack obtained by physical vapor deposition, so-called PVD.

or the anti-reflective coating can comprise, or even consists of, a layer of porous silica, especially a sol-gel layer of nanoporous silica.

The anti-reflective coating can also include an overlayer if it does not alter the anti-reflective properties.

The anti-reflective coating especially of porous silica according to the invention can have a thickness advantageously of between 10 nm and 10 μm (including these limit values), in particular 50 nm and 1 μm and even more preferentially between 70 and 500 nm.

In a first porous silica embodiment, the pores are the gaps of a non-compact stack of nanometric beads, especially of silica, this layer being described for example in document US20040258929.

In a second porous silica embodiment, the porous layer is obtained by depositing a condensed silica sol (silica oligomers) densified by NH3-type vapors, this layer being described for example in document WO2005049757.

In a third porous silica embodiment, the porous layer can also be of the sol-gel type as described in document EP1329433.

The porous (or nanoporous) silica layer may have closed pores of at least 20 nm, The porous silica can be doped for example to further improve its hydrolytic content in the case of applications which require great strength (façades, exteriors, etc.).

The anti-reflective coating, especially the layer of porous silica (sol-gel) can include a chemical protection underlayer especially with a thickness of at most 200 nm for example, especially a dense silica layer, by sol-gel with a sol-gel functional layer of porous silica on top. The underlayer can be based on silica or at least partially oxidized derivatives of silicon selected from silicon dioxide, sub-stoichiometric silicon oxides, oxycarbide, oxynitride or oxycarbonitride of silicon.

The underlayer is useful when the underlying surface is made of soda-lime-silica glass because it acts as a barrier to the alkalis.

This underlayer therefore advantageously comprises Si, O, optionally carbon and nitrogen. But it can also include minority materials relative to the silicon, for example metals like Al, Zn or Zr. The underlayer can be deposited by sol-gel or by pyrolysis, especially by gas-phase pyrolysis (CVD). The latter technique makes it possible to obtain layers of $SiO_xC_y$ or $SiO_2$ quite easily, especially by deposit directly on the float glass ribbon in the case of glass substrates. But the deposition can also be carried out by a vacuum technique, for example by cathode sputtering from a Si target (optionally doped) or from a silicon suboxide target (in a reactive oxidizing and/or nitriding atmosphere for example). This underlayer preferably has a thickness of at least 5 nm, especially a thickness of between 10 nm and 200 nm, for example between 80 nm and 120 nm.

It is also possible to place an anti-reflective element (anti-reflective coating or textured surface) on face F1.

Face F1 may further include a functional layer: hydrophobic, etc.

The lamination interlayer can include a PVB, optionally including PVB/functional film such as polymer film with athermal coating/PVB, optionally acoustic PVB, the PVB having an interlayer through-hole in line with the (first) through-hole of the second sheet.

The interlayer hole can be wider than the (first) through-hole (at least before lamination) in particular by at most 5 mm or 10 mm or to encompass a first and second through-hole.

The lamination interlayer can comprise another functional plastic film (transparent, clear or tinted), for example preferably a polyethylene terephthalate PET film supporting a layer that is athermal, electrically conductive, etc., for example a PVB/functional film/PVB between faces F2 and F3.

The other plastic film can have a thickness of between 10 and 100 μm. The other plastic film can more broadly be made of polyamide, polyester, polyolefin (PE: polyethylene, PP: polypropylene), polystyrene, polyvinyl chloride (PVC), polyethylene terephthalate (PET), polymethyl methacrylate (PMMA) or polycarbonate (PC). A clear film is preferred, especially PET.

Use may be made, for example, of a coated clear PET film, for example XIR from Eastman, a coextruded film made of PET-PMMA, for example of the SRF 3M® type, but also numerous other films (for example made of PC, PE, PEN, PMMA, PVC).

Without departing from the scope of the invention, the lamination interlayer clearly can comprise several different types of laminations made of thermoplastic material, for example, with different hardnesses in order to provide an acoustic function, as disclosed, for example, in publication U.S. Pat. No. 6,132,882, especially a set of PVB sheets with different hardnesses. Similarly, one of the glass sheets can be thin compared to the thicknesses conventionally used.

According to the invention, the interlayer can have a wedge shape, especially in view of an HUD (Head Up Display) application.

As a common lamination interlayer (of stretchable sheet(s)), other than PVB, mention can be made of the flexible polyurethane PU used, a thermoplastic such as ethylene-vinyl acetate (EVA) copolymer, an ionomer resin. These plastics have a thickness, for example, of between 0.2 mm and 1.1 mm, especially 0.3 and 0.7 mm.

In one embodiment, the glazed unit includes a heating zone (by wire(s), by layer) which takes up all or part of the surface of the glazed unit, conventionally made of a material that is transparent in the visible range but not necessarily transparent enough at the infrared working wavelength of the infrared vision system (LIDAR) in a range extending from 800 nm to 1800 nm, in particular between 850 nm and 1600 nm. In particular there can be a first "main" heating zone, extending over all or part of the glazed unit optionally outside the zone in front facing the through-hole and facing said optional other through-hole.

It may also be desirable for the communication window (and the other optional communication window) to be protected against frost and mist especially by heating.

This can be done by one or more heating metal wires located facing the through-hole or even in the vicinity thereof or even by one or more heating wires extending over all or part of the glazed unit. The arrangement of the one or more wires can make it possible to maintain overall transparency at the infrared working wavelength.

This can also be done by a local heating layer facing the through-hole made of a material that is transparent at the infrared working wavelength.

In one embodiment, the glazed unit according to the invention can include at least one metal wire (a coiled wire, for example) especially heating, connected to the lamination interlayer, within the lamination or especially on the side of face Fb especially anchored on face Fb (or even on the side of Fa, anchored on Fa) and absent facing said through-hole.

It may be sought to avoid the heating wire or wires facing the through-hole and/or for reasons of optical distortions.

More specifically, it is possible to have a local heating zone under and/or in said through-hole, in particular spaced apart or on the connecting surface, especially by an arrangement of tracks or wire(s) (wire(s), etc.) of an electrically conductive material, especially absorbent, which arrangement is for keeping the overall transparency at the working wavelength in the infrared or by a heating layer made of material which is transparent at the working wavelength in the infrared, especially organic (ink, conductive polymer) or inorganic.

The local heating zone can be connected to at least two electrical leads which are in particular one or more flat connectors or (in the case of a heating layer) electrically conductive busbars intended for connecting to a voltage source so that a current path for a heating current is formed therebetween. It is not always necessary to have busbars in the case of heating wire(s) for which a flat connector (useful for point contacts such as wires) can be used.

The two electrical leads are preferably masked off from the outside by a masking layer which is opaque (in the visible range and in the near infrared at the working wavelength) and/or by the masking layer further toward the outside than the busbars.

The thickness of the heating layer can have a sheet resistance of at most 100 or 50 or even 30 ohms per square.

The supply may be 12 V, 24 V, 15 V, 48 V.

The heating layer is for example mineral.

More generally, the local busbars are preferably masked from the outside by a masking element:
coating and/or film which is opaque (in the visible range and the near infrared at the working wavelength) on face F2, such as an enamel (screen-printing, etc.) or on or in the lamination interlayer, such as an ink (printed) the masking layer.

The local heating zone, in particular the local heating layer, can extend beyond the through-hole for example over at most 30 mm. It can have the same shape as the through-hole, especially homothetic (trapezoidal etc.) or even any other shape, for example rectangular (and trapezoidal hole). The two local busbars or flat connector(s) are thus preferably all or in part offset from the through-hole under face F3 and even masked from the outside, as already described.

The local heating layer can be spaced apart from the connecting surface, especially under the through-hole and extending under face F3, with the two local busbars all or in part offset from the through-hole, under face F3 and even masked from the outside, as already described. The first and second busbars are preferably at a distance of at most 1 cm from the through-hole.

The local heating layer can be spaced apart or on the connecting surface and the two local busbars are at a distance of at most 30 cm or even 20 cm, or even are lateral, especially vertical or oblique, along the short sides of the trapezoidal through-hole.

The local heating layer can be on the connecting surface with the two local busbars, preferably at the periphery, masked from the outside as already described by the opaque masking layer and/or by the masking layer.

To this end, the opaque masking layer can then overhang under, and at the periphery of, the through-hole.

In the case of two through-holes, it is possible to have another separate local heating zone or a common local heating zone.

It is possible in particular to have:
an optional main heating zone with at least two electrical leads typically in the peripheral zone of the glazed unit (on the same edge, on two opposite edges or even two adjacent edges of the glazed unit), for example by an electrically conductive heating coating (holes in line with the through-hole)
the local heating zone with at least two electrical leads or local busbars, first and second busbars preferably masked from the outside as mentioned above.

Preferably, the busbars are on either side of the through-hole.

In one configuration, the first and second busbars, especially in the vicinity of the through-hole, are on two opposite sides of the through-hole.

One or the busbars (local) can be continuous or discontinuous by sections.

The busbars (local) are in the form of especially rectangular strips which are (at least in part) outside the zone of the through-hole.

The width of the busbars (local) is preferably from 2 mm to 30 mm, in a particularly preferred way from 4 mm to 20 mm and in particular from 10 mm to 20 mm.

A busbar (local) especially in a layer (printed) preferably contains at least one metal, a metal alloy, a metal and/or carbon compound, in particular preferably a noble metal and, in particular, silver. For example, the printing paste preferably contains metal particles, metal and/or carbon particles and, in particular, noble metal particles such as silver particles. The thickness of a layer busbar (printed) can preferably be from 5 µm to 40 µm, in a particularly preferred way from 8 µm to 20 µm and more particularly preferably from 8 µm to 12 µm.

Alternatively, however, it is possible to use for one or each busbar (local) an electrically conductive sheet, especially a strip, for example rectangular. The busbar then contains, for example, at least aluminum, copper, tinned copper, gold, silver, zinc, tungsten and/or tin or alloys thereof. This sheet busbar (strip) preferably has a thickness of 10 µm to 500 µm, in a particularly preferred way of 30 µm to 300 µm.

The sheet busbar is in particular used for the heating wires bonded to the lamination interlayer.

The first busbar is preferably (substantially) horizontal and closest to the upper longitudinal edge of the glazed unit and the second busbar is then preferably (substantially) horizontal, first and second busbar on either side of the through-hole.

The supply of power is for example of 15 V or 48 V.

The length of the busbars are adapted to measure, for example equal to or longer than the sides of the through-hole facing them.

It is sought to bring the busbars as close together as possible to increase the power density in the transparent heating layer. Preferably, the distance between busbars is at most 20 cm or 10 cm or 6 cm.

The supply of power of the (first, second) busbars can be provided wirelessly and/or with a connector (wires, flat connectors, etc.).

The busbars can be lateral, that is to say to the left and right of the through-hole along the lateral edges of the glazed unit.

The first busbar can be preferably lateral (vertical or oblique) and the second busbar is then preferably (substantially) lateral (vertical or oblique), first and second busbar on either side of the first through-hole.

In a first configuration (with horizontal dedicated busbars):
  the first local busbar (sheet or coating) is adjacent and even parallel to a first large side of the trapezoidal (or rectangular) through-hole, preferably large side closest to the upper longitudinal edge of the glazed unit,
  the second local busbar (sheet or coating) is adjacent and even parallel to a second large side of the trapezoidal (or rectangular) through-hole, busbars on either side of the through-hole.

In a second configuration (with lateral dedicated busbars (vertical or oblique)):
  the first local busbar (sheet or coating) is adjacent and even parallel to a first small side of the trapezoidal (or rectangular) through-hole
  the second local busbar (sheet or coating) is adjacent and even parallel to a second first small side of the trapezoidal (or rectangular) through-hole, busbars on either side of the through-hole In the case of a round or oval through-hole, the busbars (substantially horizontal or lateral, common or dedicated busbars) can be curved to match the shape of the through-hole.

For busbars under and/or offset from the through-hole, vertical or oblique lateral busbars (parallel with respect to the small sides of the through-hole) may be preferred since the horizontal busbars can generate local overthicknesses that promote distortions.

The first local heating zone and/or overall heating zone includes for example one or a plurality of individual metal wires, referred to as "heating metal wires" which connect the "busbars" to one another. The heating current passes through these individual metal wires.

In particular, the glazed unit can include at least one first metal wire (a coiled wire for example), especially heating, connected to the lamination interlayer facing the through-hole especially:
  on the side of face Fb especially anchored on face Fb or within the lamination interlayer between a first lamination (on the side of face F2) and second interlayer (on the side of face F3), laminations of identical or different thicknesses, etc.
  or even especially on the side of face Fa especially anchored on face Fa The heating wire or wires especially have a thickness less than or equal to 0.1 mm preferably made of copper, tungsten, gold, silver or aluminum or alloys of at least two of these metals.

The wire or wires are advantageously very thin so as not to impair, or only very slightly impair, the transparency of the glazed unit. Preferably, the metal wires have a thickness less than or equal to 0.1 mm, in particular between 0.02 and 0.04 mm and ideally between 0.024 mm and 0.029 mm. The metal wire or wires preferably contain copper, tungsten, gold, silver or aluminum or an alloy of at least two of these metals. The alloy can also contain molybdenum, rhenium, osmium, iridium, palladium or platinum.

The metal wire or wires are preferably electrically insulated.

Furthermore, the glazed unit may include, on face F2, a functional film or coating with a first zone facing the through-hole, the functional film (or functional coating) being transparent to at least the working wavelength in the infrared at least in the first zone, especially a heating coating.

The functional element (film or functional coating) on face F2 can be local, in the region of the through-hole and take up less than 30, 10%, 5% of the glazed unit.

The functional element (film or functional coating) on face F2 can have any rectangular or square general shape, identical and even homothetic to the shape of the through-hole.

The functional element on face F2 can be a coating which:
  is spaced apart from an adjacent layer on face F2, in particular opaque masking layer (black, enamel) with a gap in line with the through-hole,
  or covers or is under, over less than 5 cm, or 1 cm, an adjacent layer on face F2 in particular an opaque masking layer (especially black, enamel or other) with a gap in line with the through-holes.

More broadly speaking, the glazed unit can thus include, on face F2 (or on face F3 or else on a polymer film between face F2 and F3) a functional (athermal) layer, extending over all or part of the glazed unit, especially a transparent (in the visible range) electrically conductive, optionally heating layer, in particular a silver stack, or else as already cited an opaque masking layer, especially an enamel, functional layer which absorbs at the working wavelength in the infrared, and which is absent from said through-hole at least in the central zone and has at the edge of the through-hole between face F2 and Fa, especially by means of a gap. Optionally, the masking layer is facing the through-hole is in contact with said functional layer, especially on the functional layer.

Said functional coating is on face F2, transparent at the working wavelength, is facing the through-hole, especially local heating layer (as mentioned above) optionally being in contact with said masking layer, especially on or under the masking layer The functional layer can then have a gap in line with said through-hole (at least in the central zone) and preferably which protrudes by at most 50 mm, 30 mm or 20 mm or 10 mm, 7 mm or 5 mm in said through-hole.

The transparent electrically conductive functional layer (solar control and/or heating) can include a stack of thin layers comprising at least one metal functional layer such as silver (on F2 or preferably F3 or on a polymer film). The or each functional (silver) layer is arranged between dielectric layers.

The functional layers preferably contain at least one metal, for example, silver, gold, copper, nickel and chromium or, or a metal alloy. The functional layers in particular preferably contain at least 90% by weight of the metal, in particular at least 99.9% by weight of the metal. The functional layers can be made of metal for the metal alloy. The functional layers contain in a particularly preferred manner silver or an alloy containing silver. The thickness of a functional layer (silver, etc.) is preferably from 5 nm to 50 nm, more preferentially from 8 nm to 25 nm. A dielectric layer contains at least one individual layer made of a dielectric material, for example, containing a nitride such as silicon nitride or an oxide such as aluminum oxide. The dielectric layer can however also contain a plurality of individual layers, for example, individual layers of a dielectric material, layers, smoothing layers, which corresponds to blocking layers and/or "anti-reflective" layers. The thickness of a dielectric layer is, for example, from 10 nm to 200 nm. This layer structure is generally obtained by a series of deposition operations that are carried out by a vacuum process such as field-supported magnetic cathode sputtering.

The transparent electrically conductive layer is a layer (single-layer or multi-layer, thus a stack) preferably with a total thickness less than or equal to 2 μm, in a particularly preferred way less than or equal to 1 μm.

Naturally, the most desirable application is that the glazed unit be a windshield for a road vehicle (automobile) or even for a rail vehicle (moderate speed).

For the glass of the first glass sheet and/or of the second glass sheet, preferably a soda-lime-silica type glass is used.

The interior and/or exterior glass may have undergone a chemical or heat treatment of the hardening or annealing type or may have undergone tempering (especially in order to obtain better mechanical strength) or can be semi-tempered.

The glass of the first glass sheet and/or of the second glass sheet is preferably of the float glass type, that is to say obtainable by a method consisting in pouring molten glass onto a bath of molten tin (called a "float" bath). The terms "atmosphere" and "tin" faces are understood to mean those faces that have been in contact with the atmosphere in the float bath and in contact with the molten tin respectively. The tin face contains a small surface amount of tin that has diffused into the structure of the glass.

Furthermore, in order to quantify the transmission of the glass in the visible range, a light transmission factor, referred to as light transmission, is often defined, often abbreviated to "$T_L$", calculated between 380 and 780 nm and applied to a glass thickness of 3.2 mm or 4 mm, according to ISO standard 9050:2003, thus taking into account the illuminant D65 as defined by ISO/CIE standard 10526 and the C.I.E 1931 standard colorimetric observer as defined by ISO/CIE standard 10527.

Naturally, the light transmission $T_L$ of the laminated glazed unit in a zone without a hole (central zone of the windshield) is preferably of at least 70% or 75%, 80% or 85%, 88%.

The second glass sheet especially is green, blue, gray. The second glass sheet can be green by the $Fe_2O_3$ or blue with CoO and Se or gray with Se and CoO.

The glasses of the applicant called TSAnx (0.5 to 0.6% iron) TSA2+, TSA3+ (0.8 to 0.9% iron), TSA4+ (1% iron), TSA5+, for example green, can especially be mentioned.

TSA3+ (2.1 mm) for example has a total transmission at 905 mm of about 40% and at 1550 mm of about 50%.

The second glass sheet can have a redox, defined as being the ratio between the content by weight of FeO (ferrous iron) and the total iron oxide content by weight (expressed in the form $Fe_2O_3$) between 0.22 and 0.35 or 0.30.

Said second glass sheet can have a chemical composition that comprises the following constituents in a content varying within the limits by weight defined hereinafter:

| | |
|---|---|
| $SiO_2$ | 64-75% |
| $Al_2O_3$ | 0-5% |
| $B_2O_3$ | 0-5%, |
| CaO | 2-15% |
| MgO | 0-5% |
| $Na_2O$ | 9-18% |
| $K_2O$ | 0-5% |
| $SO_3$ | 0.1-0.35% |

$Fe_2O_3$ (total iron) at least 0.4% and even 0.4 to 1.5%, Optionally redox 0.22-0.3

And especially less than 0.1% impurities.

The first glass sheet can for example be a soda-lime-silica glass such as Saint-Gobain Glass's Diamant® glass, or Pilkington's Optiwhite®, or Schott's B270®, or AGC's Sunmax® or of other composition described in document WO04/025334. The Planiclear® glass from the Saint-Gobain Glass company can also be chosen.

The laminated glazed unit according to the invention, in particular for a private car (windshield etc.) or truck, can be curved (bent) in one or more directions especially with, for the first sheet, the second sheet, a radius of curvature of 10 cm to 40 cm. It can be flat for buses, trains, tractors.

With ordinary natural raw materials, the total content by weight of iron oxide is of the order of 0.1% (1000 ppm). To reduce the iron oxide content, particularly pure raw materials can be selected.

In the present invention, the $Fe_2O_3$ content (total iron) of the first glass sheet is preferably less than 0.015%, even less than or equal to 0.012%, especially 0.010%, in order to increase the near-infrared transmission of the glass. The $Fe_2O_3$ content is preferably greater than or equal to 0.005%, especially 0.008% so that the cost of the glass is not a disadvantage.

In order to further increase the infrared transmission of the first glass sheet, the ferrous iron content can be reduced in favor of the ferric iron, thus oxidizing the iron present in the glass. Thus, the desire is for glasses having the lowest possible redox, ideally zero or nearly 0. This number can vary between 0 and 0.9 of zero redoxes corresponding to a totally oxidized glass.

Glasses comprising low quantities of iron oxide, especially less than 200 ppm, even less than 150 ppm, have a natural tendency to have high redoxes, greater than 0.4, even 0.5. This tendency is probably due to the displacement of the oxidation-reduction equilibrium of the iron based on the content of iron oxide. The redox of the first glass sheet is preferably greater than or equal to 0.15, and especially between 0.2 and 0.30, especially between 0.25 and 0.30. In fact, excessively low redoxes contribute to reducing the working life of the furnaces.

In the glasses according to the invention (first and second sheet), the silica $SiO_2$ is generally maintained within narrow limits for the following reasons. Above 75%, the viscosity of the glass and its aptitude for devitrification increase greatly, which makes its melting and pouring onto the molten tin bath more difficult. Below 60%, especially 64%, the hydrolytic gapance of the glass decreases rapidly. The preferred content is between 65 and 75%, especially between 71 and 73%.

Said first glass sheet can have a chemical composition that comprises the following constituents in a content varying within the limits by weight defined hereinafter:

| | |
|---|---|
| $SiO_2$ | 60-75% |
| $Al_2O_3$ | 0-10% |
| $B_2O_3$ | 0-5%, preferably 0 |
| CaO | 5-15% |
| MgO | 0-10% |
| $Na_2O$ | 5-20% |
| $K_2O$ | 0-10% |
| BaO | 0-5%, preferably 0, |
| $SO_3$ | 0.1-0.4% |
| $Fe_2O_3$ (total iron) | 0 to 0.015%, |
| and Redox | 0.1-0.3. |

Throughout the text, the percentages are percentages by weight.

The glass sheets are preferably formed by floating on a tin bath. Other types of forming methods can be used, such as drawing methods, down-draw method, lamination method, Fourcault method, etc.

The glass composition of the first glass sheet can comprise, other than the inevitable impurities contained especially in the raw materials, a small proportion (up to 1%) of other constituents, for example agents aiding in the melting or refining of the glass (Cl . . . ), or still elements resulting from the dissolving of the refractories used in the construction of the furnaces (for example $ZrO_2$). For the reasons already mentioned, the composition according to the invention preferably does not comprise oxides such as $Sb_2O_3$, $As_2O_3$ or $CeO_2$.

The composition of the first glass sheet preferably does not comprise any infrared absorbing agent (especially for a wavelength comprised between 800 and 1800 nm). In particular, the composition according to the invention preferably does not contain any of the following agents: oxides of transition elements such as CoO, CuO, $Cr_2O_3$, NiO, $MnO_2$, $V_2O_5$, rare earth oxides such as $CeO_2$, $La_2O_3$, $Nd_2O_3$, $Er_2O_3$, or coloring agents in elemental state such as Se, Ag, Cu. Among the other agents also preferably excluded are oxides of the following elements: Sc, Y, Pr, Sm, Eu, Gd, Tb, Dy, Ho, Tm, Yb, Lu. These agents often have a very powerful undesirable coloring effect, appearing at very small quantities, sometimes on the order of a few ppm or less (1 ppm=0.0001%). Their presence thus very greatly reduces the transmission of the glass.

Preferably, the first glass sheet has a chemical composition that comprises the following constituents in an amount varying within the limits by weight as defined hereinafter:

| | |
|---|---|
| $SiO_2$ | 60-75% |
| $Al_2O_3$ | 0-10% |
| $B_2O_3$ | 0-5%, preferably 0 |
| CaO | 5-15% |
| MgO | 0-10% |
| $Na_2O$ | 5-20% |
| $K_2O$ | 0-10% |
| BaO | 0-5%, preferably 0, |
| $SO_3$ | >0.2-0.4% |
| $Fe_2O_3$ (total iron) | 0 to 0.015%, |
| And Redox | 0.2-0.30. |

In the present invention, the $Fe_2O_3$ content (total iron) is preferably less than 0.015%, even less than or equal to 0.012%, especially 0.010%, in order to increase the near infrared transmission of the glass. The $Fe_2O_3$ content is preferably greater than or equal to 0.005%, especially 0.008%, so as not to adversely impact the cost of the glass (of the second glass sheet).

The redox is preferably greater than or equal to 0.15, and especially between 0.2 and 0.30, especially between 0.25 and 0.30. In fact, excessively low redoxes contribute to reducing the working life of the furnaces.

In the glasses according to the invention (first sheet, second sheet), the silica $SiO_2$ is generally maintained within narrow limits for the following reasons. Above 75%, the viscosity of the glass and its aptitude for devitrification increase greatly, which makes its melting and pouring onto the molten tin bath more difficult. Below 60%, especially 64%, the hydrolytic resistance of the glass decreases rapidly. The preferred content is between 65 and 75%, particularly especially between 71 and 73%.

The invention also relates to a device, which comprises:
the laminated glazed unit as previously described
an infrared vision system at the infrared working wavelength, arranged in the passenger compartment behind said glazed unit and including a transmitter and/or receiver, so as to send and/or receive (laser) radiation passing through the first glass sheet at the through-hole, in particular so as to receive or even send (laser) radiation passing through the first glass sheet at the first through-hole and so as to send or even receive (laser) radiation passing through the first glass sheet at the second through-hole under the first through-hole, especially separated by an hole-to-hole distance of at least 8 cm.

The infrared vision system (LIDAR) can be of different technologies. It makes it possible to measure the vehicle's environment by determining the distance of the object closest to the vehicle in a wide range of angular directions. Thus, the vehicle's environment can be reconstituted in 3D. The technology employed is based on sending a light beam and receiving it after it has diffusely reflected off an obstacle. This can be done by a rotating source, scanned by microelectromechanical systems (MEMS) or by a fully solid system. A single flash of light can thus illuminate the whole environment.

For all these technologies, the light must pass through the glazed unit twice, when outgoing and when incoming, which explains the necessity to have a glazed unit with excellent transparency at the working wavelength of the LIDAR.

The speed can also be measured with DOPPLER technology.

The infrared vision system (LIDAR) is preferably spaced apart from the anti-reflective element.

The piece according to the invention is preferably spaced apart from the infrared vision system (LIDAR) and/or does not serve for the attachment of same. The infrared vision system (LIDAR) can be facing or offset from said through-hole (and from the piece), for example an optical system is between the piece and the of the infrared vision system (LIDAR).

The infrared vision system (LIDAR) is for example attached via face F4 and/or the bodywork, the roof trim. The infrared vision system (LIDAR) can be offset.

The infrared vision system (LIDAR) is for example integrated in a plate or a multifunction base able to (designed to) optimize the positioning thereof relative to the windshield and the piece by being adhesively bonded to face F4.

In the case of the second through-hole under the first through-hole, it is preferable to position the emitter of the infrared vision system facing the second through-hole and the receiver of the infrared vision system facing the first through-hole.

Some advantageous but non-limiting embodiments of the present invention are described hereafter, which of course can be combined as appropriate. The views are not to scale.

Some advantageous but non-limiting embodiments of the present invention are described hereafter, which of course can be combined as appropriate. The views are not to scale.

Figure 2:
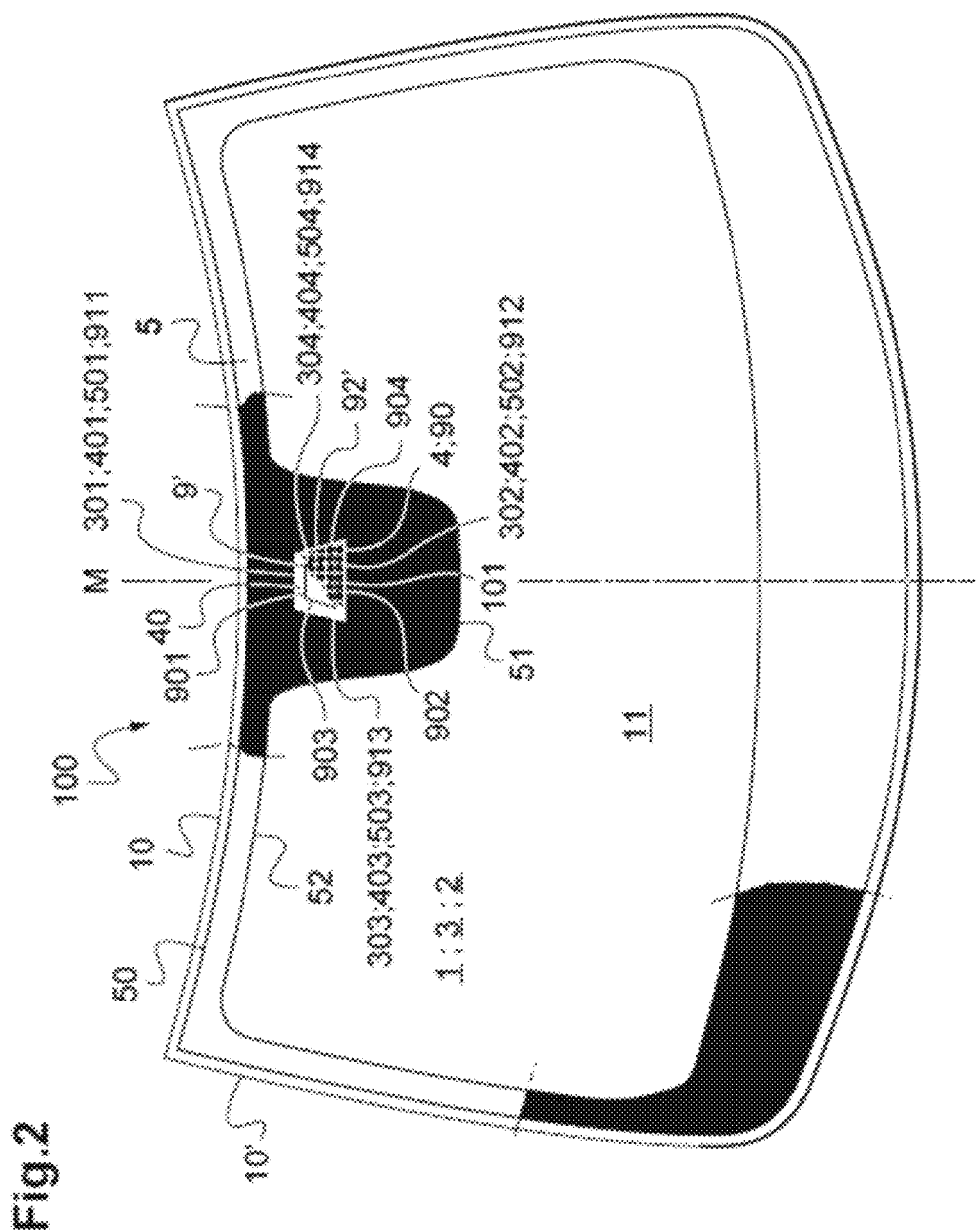
FIG. 2 shows a schematic front view (from the outdoor side) of the windshield 100 of the first embodiment of the invention.

FIG. 2' shows a schematic front view (from the outdoor side) of the windshield 1000 in a first variant of the first embodiment of the invention.

FIG. 3 shows a schematic front view (from the outdoor side) of the windshield 100' in a second variant of the first embodiment of the invention.

FIG. 4 shows a schematic front view (from the outdoor side) of the windshield 100'' in a third variant of the first embodiment of the invention.

Figure 1:
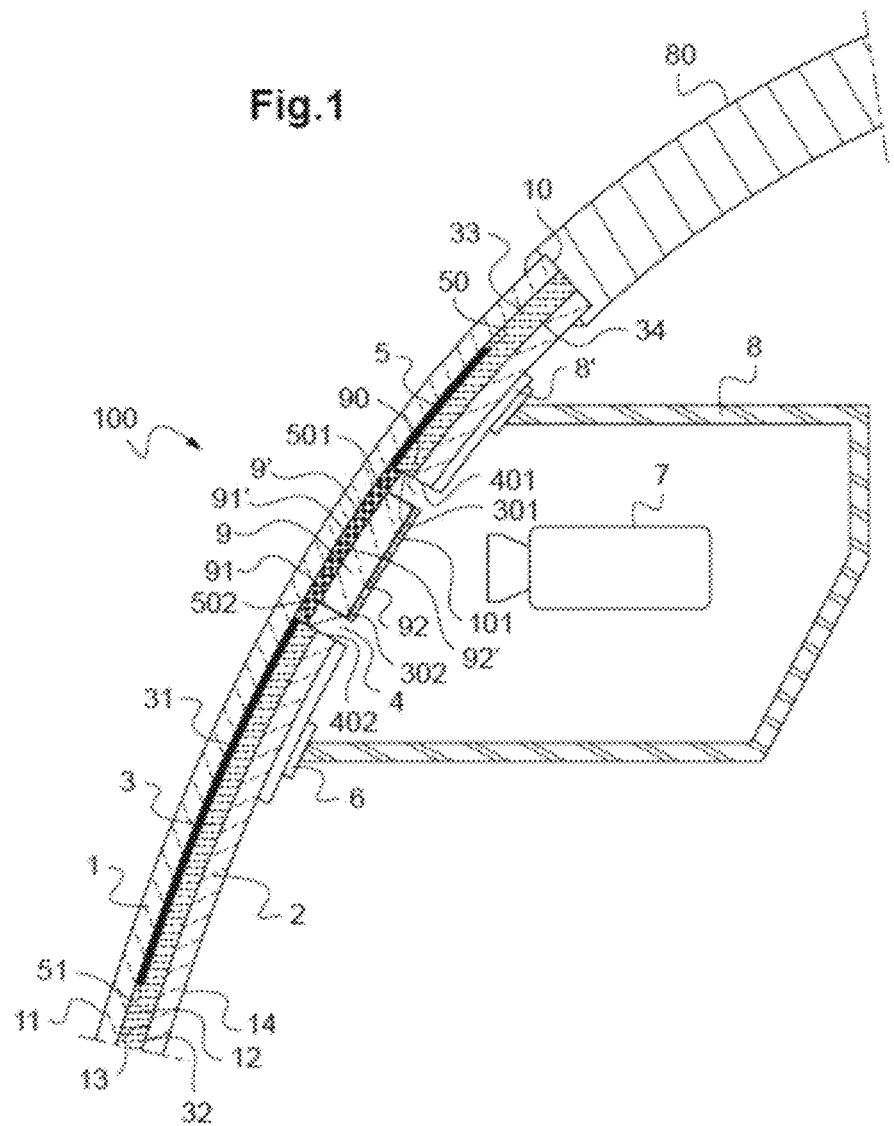
FIG. 1 shows schematically in cross sectional view a windshield 100 in a first embodiment of the invention with an infrared vision system such as a LIDAR.

FIG. 5 shows a schematic sectional view of a method for manufacturing a windshield 110 with a masking layer and a piece in the through-hole similar to that of FIG. 1.

FIG. 6 shows a schematic sectional view of a method for manufacturing a windshield 111 with a masking layer and a piece in the through-hole similar to that of FIG. 1.

FIG. 7 shows schematically in cross sectional view a windshield 200 according to the invention with an infrared vision system such as a LIDAR in a second embodiment of the invention.

FIG. 8 shows a schematic sectional view of a method for manufacturing the windshield 200 with a masking layer and a piece in the through-hole.

FIG. 9 shows a schematic sectional view of a windshield 300 according to the invention with an infrared vision system such as a LIDAR in a third embodiment of the invention.

FIG. 10 shows a schematic sectional view of a windshield 400 according to the invention with an infrared vision system such as a LIDAR in a fourth embodiment of the invention.

FIG. 11 shows a schematic sectional view a of windshield 500 according to the invention, with an infrared vision system such as a LIDAR in a fifth embodiment of the invention.

FIG. 12 shows a schematic front view (from the outdoor side) of this windshield 600 of FIG. 11.

FIG. 13 shows a schematic front view (from the outdoor side) of the windshield 601 in a variant of the fifth embodiment.

Figure 14:
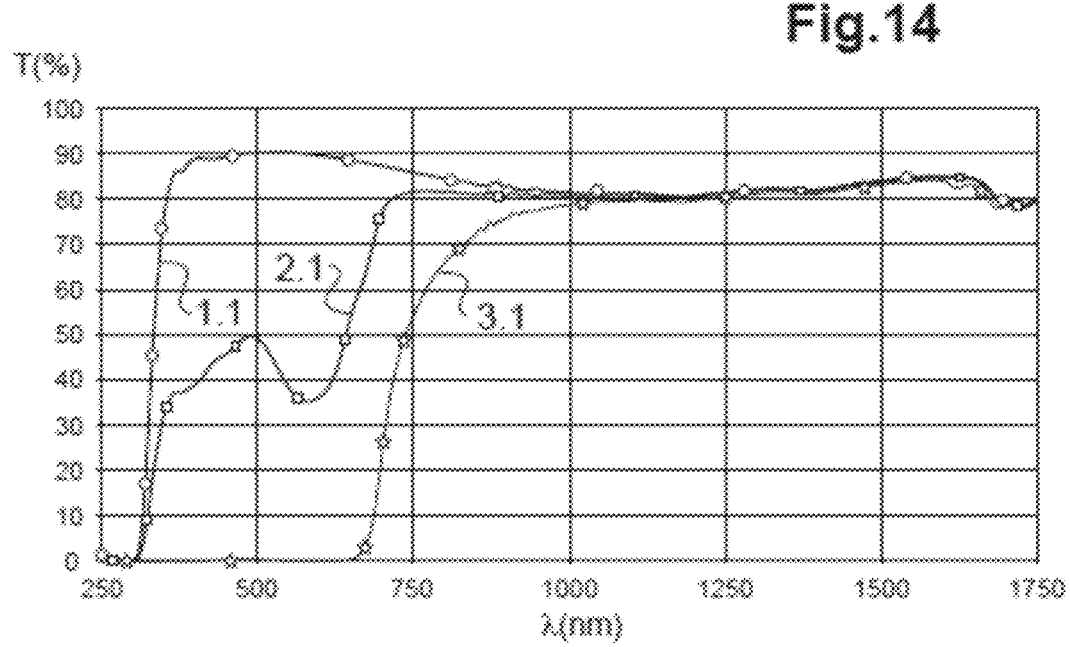

FIG. 14 shows three total transmission curves T (in %) of motor vehicle glazed units, coated or not with a masking layer and serving as glue for a glass piece, total transmission depending on the wavelength of 250 nm at 1750 nm.

Figure 15:
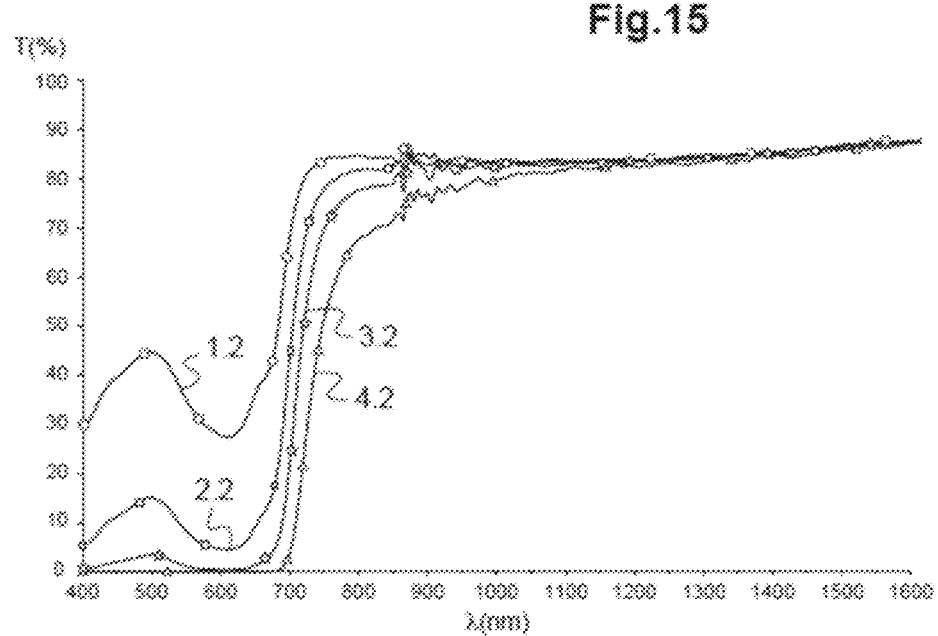

FIG. 15 shows four total transmission curves for motor vehicle glazed units coated with a masking layer capable of acting as glue for a piece, the total transmission depending on the wavelength. These curves show the influence of the colorant concentration.

FIG. 16 shows five total transmission curves T at 1550 nm of motor vehicle glazed units coated with various types of adhesive layers used to fix a glass piece, T depending on the thickness of the layer.

FIG. 1 shows schematically a windshield of a vehicle especially a motor vehicle 100 according to the invention, with an infrared vision system such as a LIDAR preferably at about 1550 nm including a transmitter/receiver 7.

This vision system 7 is placed behind the windshield facing a zone that is preferably located in the central and upper part of the windshield. In this zone, the infrared vision system is oriented at a certain angle with respect to the surface of the windshield (face F4 14). In particular, the transmitter/receiver 7 can be oriented directly toward the image capture zone, in a direction that is nearly parallel to the ground, that is to say slightly inclined toward the road. In other words, the transmitter/receiver 7 of the LIDAR can be oriented toward the road at a slight angle with a field of vision suitable for fulfilling their functions. As a variant, the receiver is separate from the transmitter, especially adjacent to or below the transmitter.

The windshield 100 is a curved laminated glazed unit comprising:
an external glass sheet 1, with an exterior face F1 and an interior face F2
and an internal glass sheet 2, for example with a thickness or even of 1.6 mm or even less, with an exterior face F3 and an interior face F4 on the passenger compartment side
the two glass sheets being connected to one another by an interlayer made of thermoplastic material 3 (single or multi-sheet), most usually of polyvinyl butyral (PVB), preferably clear, of submillimeter thickness optionally having a cross section decreasing in the shape of a wedge from the top to the bottom of the laminated glazed unit, for example a PVB (RC41 from Solutia or Eastman) with a thickness of about 0.76 mm, or as a variant if necessary an acoustic PVB (three-layer or four-layer), for example with a thickness of about 0.81 mm, for example an interlayer in three PVB sheets, PVB with a main internal face 31 and a main face 32.

The lamination interlayer 3, for example, is here in two PVB sheets 33, 34 each 0.38 mm.

The windshield of a road vehicle in particular is curved.

In a conventional and well-known way, the windshield is obtained by hot lamination of the first, second curved glass sheets 1, 2 and the interlayer 3. For example a clear PVB of 0.76 mm is selected.

The first glass sheet 1, especially silica-based, soda-lime-based, soda-lime-silica-based (preferably), aluminosilicate-based, or borosilicate-based, has a total iron oxide content by weight (expressed in the form $Fe_2O_3$) of at most 0.05% (500 ppm), preferably of at most 0.03% (300 ppm) and at most 0.015% (150 ppm) and especially greater than or equal to 0.005%. The first glass sheet can preferably have a redox greater than or equal to 0.15, and especially between 0.2 and 0.30, especially between 0.25 and 0.30. An OPTWHITE glass of 1.95 mm is especially selected.

The second glass sheet 2 especially silica-based, soda lime-based, preferably soda-lime-silica-based (like the first glass sheet), even aluminosilicate-based or borosilicate-based, has a total iron oxide content by weight of at least 0.4% and preferably of at most 1.5%.

The glasses of the Applicant called TSAnx (0.5 to 0.6% iron) TSA2+, TSA3+ (0.8 to 0.9% iron), TSA4+ (1% iron), TSA5+, for example green, can especially be mentioned. For example a TSA3+ glass of 1.6 mm is selected.

According to the invention, in a central peripheral region along the upper longitudinal edge 10, the windshield 100 includes:
a through-hole 4, here closed, of the second glass sheet 2, which hole 4 is thus delimited by a wall of the glass 401 to 404
optionally in a first variant (with separate emitter and receiver, close to the first through-hole (which is for the receiver) a second closed through-hole of the second glass sheet 2 (which is for the emitter) under the first hole (as shown in FIG. 2') and preferably spaced at least 8 cm apart.

A central line M is defined passing through the middle of the upper edge which can be an axis of symmetry of the glazed unit.

The through-hole 4 can be central; thus the line M passes through and divides it into two identical parts.

As also shown in FIG. 2 (sectional view along M), the through-hole 4 is here a closed hole (surrounded by the wall of the glass sheet), thus within the glazed unit especially—with trapezoidal cross section—including:

a first large side 401 or "upper" longitudinal edge closest to the edge face of the upper longitudinal edge of the glazed unit 10—parallel to this edge face—with a length of at most 20 cm for example 8 cm and spaced apart by at least 5 cm or 6 cm from the edge face 10 a second large side 402 or "lower" longitudinal edge (farthest from the edge face of the upper longitudinal edge 10, near the central zone) parallel to the first large side with a length of at most 25 cm or 20 cm and preferably greater than that of the first large side for example 14 cm, first and second small sides 403, 404, or oblique lateral edges.

The height (between the large sides 401, 402) is at least 5 cm, here 6 cm.

The lamination interlayer 3 also has an interlayer through-hole in line with the closed through-hole 4 here delimited by walls 301, 302, 303, 304.

The interlayer hole can preferably be of identical size or wider than the hole 4 of the sheet 2.

The interlayer hole here has the same trapezoidal shape as the hole 4 with two large longitudinal sides (walls) 301, 302 and two small lateral sides (walls) 303, 304.

The interlayer hole can preferably be identical in size to, or wider than, the hole 4 for example the walls 301 to 304 delimiting the interlayer hole being set back by at most 10 mm or 5 mm from the walls of the glass 401 to 404. As a variant, this is a rectangle or any other shape encompassing the surface of the through-hole 4 (trapezoidal or other).

In the through-hole 4 and optionally under the through-hole 4 (under face F3) and/or flush over face F4, a piece 9 is present, made of material (especially a mineral like glass or a polymer like PC or PMMA) which is transparent at least at the "working" wavelength in the infrared of the LIDAR in a range extending from 800 nm to 1800 nm, in particular from 1200 nm to 1800 nm, preferably 1550±30 nm.

The piece 9 has a main "connecting" surface 91, in particular naked or coated with a functional layer and a main "interior" surface 92 opposite the connecting surface.

The interior surface 92 includes an element which is anti-reflective 101 at said working wavelength, for example an anti-reflective porous silica coating.

The piece 9 has a thickness for example of at least 0.3 mm and better still of at least 0.7 mm and preferably of at most 3 mm, especially a piece with a size (width and/or surface area) smaller than the through-hole 4.

The piece 9 has an edge face in contact with or spaced apart from the walls 401 to 404 delimiting the through-hole 4 by at most 5 mm, preferably spaced apart and by a distance of at most 2 mm and even ranging from 0.3 to 2 mm. The piece 9 here is of the same general trapezoidal shape as the hole 4 or the interlayer hole with two large edges, here longitudinal 901, 902 and two small edges, here lateral 903, 904.

The piece 9 is here curved. The piece may be flexible or preformed.

The piece 9 is for example an extra clear glass from 0.5 to 3 mm, soda-lime-silica, curved and thermally tempered. The first glass sheet 1 and the piece 9 can be an OPTIWHITE® of 1.95 mm.

The piece 9 is alternatively a flexible extra clear curved glass of 0.5 mm or 0.7 mm and optionally chemically tempered. For example, it is Gorilla® glass.

The windshield 100 includes on face F2 12 an opaque masking layer for example black 5, such as a layer of enamel or a lacquer, forming a peripheral frame of the windshield (or of the window) especially along the upper longitudinal edge 10 of the glazed unit and especially along the left lateral edge 10' of the glazed unit (see FIG. 2).

The external edge 50 of the masking layer 5 closest to the edge face 10 of the glazed unit can be spaced apart by 1 or 2 mm to several cm from the edge face 10 (longitudinal edge).

The opaque masking layer 5 here has a greater width in the central zone than in the other peripheral zones, on either side of the central zone. The masking layer 5 has an internal (longitudinal) edge 51 in the central zone of the windshield and an internal (longitudinal) edge 52 on either side of the central zone.

This central zone being provided with the closed hole 4 (FIG. 2), this masking layer 5 includes:

in line with the hole 4 and the interlayer hole, a first gap that is large enough not to disrupt the performance of the transmitter/receiver (or of the separate receiver) 7, especially slightly smaller than the through-hole 4 if appropriate, in one variant (FIG. 2'), in line with a second through-hole under the first through-hole, a second gap large enough not to interfere with the performance 7 of the separate transmitter.

The first gap here has the same trapezoidal shape as the glass hole 4 and the interlayer hole with two large (longitudinal) sides 501, 502 and two small (lateral) sides 503, 504. The first gap can be preferably of identical size or smaller than the hole 4 and/or the interlayer hole, for example the walls 501 to 504 delimiting the first gap protruding by at most 50 mm or 10 mm or even 5 mm from the walls of the glass 401 to 404. As a variant, this is a rectangle or any other shape especially inscribed in the surface of the through-hole (trapezoidal or another).

The masking layer 4 is capable of masking the casing 8 (plastic, metal, etc.) of the LIDAR 7. The casing 8 can be adhered to face F4 14 by an adhesive 6 and to the roof 80. The casing may be attached to a plate 8' mounted on face F4, with holes to allow said IR rays to pass.

In the zone of the through-hole (with the first gap), a masking layer 9', including a matrix and a coloring agent dispersed in said matrix, absorbs in the visible and transparent to the working wavelength in the infrared. This masking layer 9' serves to camouflage the through-hole, and even the LIDAR 7.

This masking layer forms an adhesive layer for bonding 9' the piece 9 to the first glass sheet, with a thickness E1, on face F2.

The masking layer 9' here has the same trapezoidal shape as the glass hole 4 and the interlayer hole with two large (longitudinal) sides 911, 912 and two small (lateral) sides 913, 914.

The so-called crosslinked polymer matrix (two-component, thermo-crosslinked or photo-crosslinked) is based on crosslinked polymer(s), E1 being submillimetric better at 850 μm or 750 μm especially less than or equal to the thickness of the lamination interlayer and/or the difference in absolute value between E0 and E1 is at most 300 μm, especially the masking layer being in such case a coating or a film especially a pressure-sensitive one.

The masking layer 9' has a face 91' on the F2 side in adhesive contact with the bare main face F2 here (tin face or atmosphere) and a face 92' in adhesive contact with the main bonding surface 91.

The masking layer 9' alternatively has another shape, for example one homothetic to that of the section of the through-hole 4, thus for example a trapezoidal shape. The masking layer 9' alternatively has a different shape than that of the section of the through-hole 4, for example a rectangular shape.

In this configuration in FIG. 1, the masking layer 9' is located in the zone of the through-hole, covering face F2 here in contact with the internal wall 301 to 304 of the interlayer hole and optionally (in a thicker variant) in contact with the internal wall 401 to 404 of the through-hole 4 of glass. The masking layer 9' does not extend beyond the through-hole under face F3.

Here, E1 is less than E0.

Possible Variants are as Follows (without being Exhaustive)

the masking layer 9' is spaced apart from the masking layer or at least does not cover it.

the masking layer 9' extends beyond the through-hole.

FIG. 2' shows a schematic front view (from the outdoor side) of the windshield 1000 in a first variant of the first embodiment of the invention, wherein there is a second through-hole of the second glass sheet and a second piece 9" transparent at the working wavelength (same material as the first piece 9').

The interlayer hole is extended to cover the first and second through-holes and between the two through-holes, for example, it forms a rectangle (cf. white dotted line).

The masking layer extends in the zone of the second through-hole and forms an adhesive layer bonding the other piece 9" to the first glass sheet 1.

This rectangle can therefore also correspond to the contours 911 to 914 of the masking layer 9' in the zone of the first through-hole and in the zone of the second through-hole and between the zones of both holes.

This rectangle can also correspond to the limits of the gap 501 to 504 of the masking layer 9 in the zone of the first through-hole and in the zone of the second through-hole and between the zones of both holes.

FIG. 3 shows a schematic front view (from the outdoor side) of the windshield 100' in a second variant of the first embodiment of the invention.

FIG. 4 shows a schematic front view (from the outdoor side) of the windshield 100" in a third variant of the first embodiment of the invention.

As shown in FIGS. 3 and 4, the through-hole 4 can alternatively be a notch, for example of trapezoidal shape (FIG. 3) or rectangular shape (FIG. 4), thus a through-hole 4 which preferably opens on the roof side (on the upper longitudinal edge 10).

The through-hole can have rounded corners (FIGS. 3 and 4).

The closed or opening through-hole 4 can be in another region of the windshield 100 or even in another glazed unit of the vehicle, in particular the rear window.

The windshield 100 can include a set of metal wires that are almost invisible, for example with a thickness of 50 μm, which are placed in or on a face of the lamination interlayer 3 (over the entire surface), for example face Fb 32 on the side of F3, in the form of lines that are optionally straight. Here, these almost-invisible metal wires are absent in line with the through-hole 4.

FIG. 5 shows a schematic sectional view of a method for manufacturing a windshield 110 with a masking layer and a piece in the through-hole similar to that of FIG. 1.

A crosslinkable composition based on OCA and with a preferably molecular colorant in order to form the solvent masking layer is deposited on face F2 by liquid route Here, the masking layer 5 slightly extends into the zone of the through-hole and is covered with the masking layer.

It is possible to choose a formulation compatible with the masking layer, for example with the enamel; the piece 9 is placed on the masking layer forming a coating (or the piece with the masking layer forming a coating on face F2).

The final thickness E1 here is less than E0.

The formulation of OCA can be deposited before assembly of the glass sheets (with the masking layer 9) and of the PVB 3 or after assembly of the glass sheets and of the PVB or even after the lamination.

As a variant, an adhesive film OCA (of size adapted to the hole of the second sheet) is placed, for example based on acrylate or silicone on face F2 before assembly of the second sheet 2. The insert can be placed on the adhesive film before or after assembly, or even after lamination.

FIG. 6 shows a schematic sectional view of a method for manufacturing a windshield 111 with a masking layer and a piece in the through-hole similar to that of FIG. 1.

A crosslinkable composition based on OCA diluted in a solvent and with molecular colorant in order to form the masking layer is deposited on face F2 by the liquid route. Here, the masking layer 5 is flush or hole or slightly extends into the zone of the through-hole. A formulation compatible with the masking layer, for example with the enamel, can be chosen.

The piece 9 is then placed.

The final thickness E1 is substantially equal to E0.

The formulation of OCA can be deposited before assembly of the glass sheets (with the masking layer 9) and of the PVB 3 or after assembly of the glass sheets and of the PVB or even after the lamination.

In the event of an OCA deposition via the liquid route on face F2 before assembly, it is preferable to use a thermocrosslinkable OCA which crosslinks due to the temperature applied during lamination.

The OCA deposition in the hole may advantageously be after lamination

As a variant, an adhesive film OCA (of size adapted to the hole of the second sheet) is placed, for example based on acrylate or silicone on face F2 before assembly of the second sheet 2. The insert can be placed on the adhesive film before or after assembly, or even after lamination.

FIG. 7 shows schematically in cross sectional view a windshield 200 according to the invention with an infrared vision system such as a LIDAR in a second embodiment of the invention.

Only the differences with the first embodiment are explained hereunder.

The masking layer 9' is located under the piece 9, in particular the masking layer is spaced from the inner wall of the interlayer hole here, the masking layer 5 slightly extends into the zone of the through-hole for an optical masking continuity.

FIG. 8 shows a schematic sectional view of a method for manufacturing the windshield 200 of FIG. 7 with a masking layer and a piece in the through-hole.

A crosslinkable composition (UV, thermo, two-component) based on OCA diluted in a solvent and with molecular colorant in order to form the masking layer is deposited onto the piece (bonding face 91) by the liquid route. Here, the masking layer 5 slightly protrudes in the zone of the through-hole. A formulation compatible with the masking layer, for example with the enamel, can be chosen.

Use is then made of an OCA crosslinkable by UV, or two-component crosslinkable by chemical reaction. The OCA is deposited on the surface of the piece, a step of pre-crosslinking (UV or advancing the chemical reaction) is advantageous in order to gel the OCA at the surface of the piece and be able to deposit everything into the hole thereafter. A vacuum is then created in order to evacuate the trapped air and complete the crosslinking in order to obtain good adhesion.

As a variant for the masking layer, a pressure-sensitive film is placed on the piece (bonding face 91), for example a crosslinked OCA based acrylate or silicone.

It is preferable to place the piece 9 with the masking layer 9' (coating or film) in the hole of the already-laminated glazed unit.

The final thickness E1 is less than E0 or alternatively substantially equal to E0.

FIG. 9 shows a schematic sectional view of a windshield 300 according to the invention with an infrared vision system such as a LIDAR in a third embodiment of the invention.

Only the differences with the second embodiment are explained below.

A functional film element or preferably a coating transparent to the working wavelength is added between face F2 12 and the masking layer 9'. It can be an adhesion primer, a heating layer, a barrier layer, etc.

FIG. 10 shows a schematic sectional view of a windshield 400 according to the invention with an infrared vision system such as a LIDAR in a fourth embodiment of the invention.

Only the differences with the first embodiment are explained hereunder.

The opaque masking layer 5 is not widened in the central zone (passing by M).

An athermal electrically conductive layer 70 (solar control, heating, etc.) is absent or is provided with a first trapezoidal gap (as a variant, rectangular, or any other shape) in line with the through-hole 4.

FIG. 11 shows a schematic sectional view a of windshield 500 according to the invention, with an infrared vision system such as a LIDAR in a fifth embodiment of the invention. FIG. 12 shows a schematic front view (from the outdoor side) of this windshield 600 of FIG. 11. FIG. 13 shows a schematic front view (from the outdoor side) of the windshield 601 in a variant of the fifth embodiment.

Only the differences with the first embodiment are explained hereunder.

The piece 9 carries a heating coating 64 which is trapezoidal in shape (like the piece), forming a local heating zone. The heating coating is made of material which is transparent at least at the "working" wavelength in the infrared. The heating coating 64 is in adhesive contact with the masking layer 9.

The horizontal longitudinal edges or large sides 641, 643 of the layer 64 are parallel to the large sides of the piece 9. The small sides 642, 644 can be parallel to the small sides of the piece 9.

The rectangular heating zone 64 is provided with two electrical leads or first and second horizontal (dedicated) local busbars 65, 66 (see FIG. 12) supplied with power 67 for example at 15 V or 48 V, or even 12 V or 24 V.

In the case of a round or oval through-hole, the substantially horizontal busbars can be curved to match the shape of the piece.

It is sought to place the busbars as close together as possible in order to increase the power density. Preferably, the distance between busbars is at most 20 cm or 10 cm or 6 cm.

In FIG. 13, the second busbars are lateral 65, 66, here oblique, parallel with respect to the small sides of the piece 9. In the case of a round or oval piece, these busbars can be curved to match the shape of the piece.

The supply of power can be adapted as a consequence. It is possible to use a flat connector in the upper zone for example between the hole and the upper longitudinal edge. The local heating zone includes a plurality of heating wires, connected to the supply of power by two adjacent horizontal busbars in the upper zone above the through-hole or by a flat connector. As a variant, the local heating zone includes a plurality of first heating wires, connected to the supply of power by first and second horizontal busbars on either side of the through-hole.

FIG. 14 shows three total transmission curves T (in %) of motor vehicle glazed units, coated or not with a cross-linked masking layer and serving as glue for a piece, total transmission depending on the wavelength from 250 nm to 1750 nm.

The first curve 1.1 serves as a reference because it shows the total transmission of a first motor vehicle glazed unit coated with a transparent layer including a given crosslinked UV matrix devoid of colorant serving as adhesive for a glass piece in an example 1A according to the invention.

This first motor vehicle glazed unit (in particular forming a windshield of a car) includes an extra-clear (curved) glass sheet of 2.8 mm called Planiclear from the applicant Company. The layer of transparent adhesive, of 0.08 mm thickness, is a crosslinked UV optical adhesive (optical clear adhesive or "OCA"): the product UVEKOL S15 already described above. The curved glass piece is in the through-hole of a tinted glass sheet which is the inner glass sheet (as shown for example in the first embodiment in relation with FIG. 1).

The infrared transmission exceeds 80% from 780 nm and in the visible range the total transmission is from about 90% up to 550 nm.

The second curve 2.1 denotes the total transmission of a second motor vehicle glazed unit (example 1B) which differs from the first glazed unit of Example 1A by the addition of a black colorant absorbing in the visible (the Epolin 7527B already described in the preceding examples) at a concentration of 0.125% by weight.

In the visible, the total transmission drops below 50% to about 600 nm. The infrared transmission remains stable at about 80% from 780 nm and at least 75% to 875 nm.

The third curve 3.1 plots the total transmission of a third motor vehicle glazed unit (example 1C) which differs from the second glazed unit of example 1B by its increased concentration to reach 1% by weight.

In the visible, the total transmission is almost zero up to about 650 nm. The infrared transmission remains stable at about 80% from 1050 nm and between 75% and 80% from 875 nm to 1050 nm.

The camouflage and selective filter function is fulfilled.

FIG. 15 shows four total transmission curves for motor vehicle glazed units coated with a masking layer capable of acting as glue for a piece, the total transmission depending on the wavelength, from 400 to 1600 nm. These curves show the influence of the colorant concentration.

Each curve 1.2, 2.2, 3.2, 4.2, shows the total transmission of an automotive glazed unit coated with a transparent layer including a matrix and a black colorant absorbing in the visible (Epolin 7527B already described in the preceding examples) at a given concentration by weight:

0.5% for the glazed unit of curve 1.2
1% for the glazed unit of curve 2.2
2% for the glazed unit of curve 3.2
4% for the glazed unit of curve 4.2.

Each motor vehicle glazed unit (in particular forming a windshield of a car) includes an extra-clear (curved) glass sheet of 4 mm called Planiclear from the applicant Company. Each masking layer was deposited by liquid route.

Each adhesive masking layer makes it possible to attach a glass piece that is placed in a hole of a sheet of tinted glass. It is also a piece made of extra-clear glass called Planiclear from the applicant Company.

Naturally, the drop in transmission in the visible range up to 600 nm is observed with the increase in % of colorant. The infrared transmission remains stable at about 80% from 1100 nm and 900 nm of at least 70% (curve 4.2) up to 85% (curve 1.2).

With a concentration of 4% colorant, the clarity is L* is less than 0.5.

FIG. 16 shows five total transmission curves T at 1550 nm of motor vehicle glazed units coated with various types of adhesive layers used to fix a glass piece, T depending on the thickness of the layer.

Each motor vehicle glazed unit (in particular forming a windshield of a car) includes an extra-clear (curved) glass sheet of 1.95 mm referred to as the Optiwhite from the Pilkington Company which is the outer glass sheet. The transparent adhesive layer, of variable thickness, is a crosslinked polymer optical glue (OCA).

The curved glass piece is also made of extra-clear glass Optiwhite, 1.95 mm, which is coated with an antireflective layer at the working wavelength of the LIDARs (near infrared) and therefore here 1550 nm. This piece is in the through-hole of a tinted sheet of glass which is the inner glass sheet (as shown in the examples, for example, the first embodiment in relation with FIG. 1).

If a silicone adhesive film from the TAICA company is chosen, and with the glass piece without an antireflective layer, the transmission T of approximately 85.4% is obtained at 1550 nm for a film with a thickness of 1 mm, 88.5% for a film with a thickness of 0.5 mm, 90% for a film with a thickness of 0.25 mm.

FIG. 16 therefore shows the absorption at 1550 nm of the different non-tinted, non-tinted OCA matrices for the masking layer according to the invention or comparative matrix (PVB). By adding a colorant according to the invention which does not absorb at 1550 nm, the results in terms of total transmission would be similar to the transparent layer.

The first curve 1.3 is a crosslinked polymer optical adhesive (optical adhesive or "OCA"): the product UZ181A already described.

The second curve 2.3 is a crosslinked polymer optical adhesive (optical adhesive or "OCA"): the product UVEKOL S-15 already described.

The third curve 3.3 is a crosslinked polymer optical adhesive (optical adhesive or "OCA"): the product Loctite SI 8650 already described.

The fifth curve 4.3 is a comparative layer based on PVB (the product RF41 from Eastman) implemented by the liquid route in a solvent.

The sixth curve 5.3 is a comparative layer in the form of a self-supporting sheet (before lamination) based on PVB, with little or no plasticizer: PVB Mowital from Kuraray.

These curves also show the influence of the choice of the nature of the selective coloring layer. The three OCAs are more transparent than the comparative layers based on PVB regardless of the thickness.

The difference in transparency between OCA (and between PVB) increases with thickness.

Without explaining it, it is found that the product with MOWITAL PVB is less good than RF41 PVB.

The molar absorption coefficient of the OCA UZ181A matrix at 1550 nm is 33 $m^{-1}$. The molar absorption coefficient of the UvekolS15 matrix at 1550 nm is 54 $m^{-1}$. The molar absorption coefficient of the Loctite8650 matrix at 1550 nm is 55 $m^{-1}$. The molar absorption coefficient of the comparative matrix RF41 at 1550 nm is 83 $m^{-1}$. The molar absorption coefficient of the Mowital comparative matrix at 1550 nm is 220 $m^{-1}$.

The invention claimed is:

1. A vehicle laminated glazed unit, with a given thickness, comprising:
    a first glass sheet intended to be an exterior glazed unit, with a first external main face and a second internal main face oriented toward a passenger compartment,
    a lamination interlayer made of polymer material forming an interlayer material having a thickness E0, with a main face oriented toward the second internal main face and another main face opposite the main face,
    a second glass sheet intended to be an interior glazed unit with a third main face oriented toward the second internal main face and a fourth internal main face oriented toward the passenger compartment,
    the first glass sheet has a total iron oxide content by weight of at most 0.05%,
    a through-hole, in a thickness of the second glass sheet, the through-hole being centimetric, the through-hole delimited by a wall, closed or open hole, the through-hole extended by another through-hole forming an interlayer hole in a thickness of the lamination interlayer,
    in a zone of the through-hole, a masking layer including a matrix and a coloring agent dispersed in said matrix, the masking layer absorbing in the visible and transparent at at least one working wavelength in the infrared range from 800 nm to 1800 nm,
    wherein, in the through-hole, a piece, transparent at least at the working wavelength, is provided, the piece having a main bonding surface oriented toward the second internal main face and in contact with the masking layer and a main inner surface opposite the bonding surface,
    wherein the masking layer forms an adhesive layer for bonding the piece to the first glass sheet via the main bonding surface, the masking layer having a thickness E1,
    and the matrix is based on crosslinked polymer, E1 being submillimetric.

2. The laminated vehicle glazed unit according to claim 1, wherein a difference in absolute value between E0 and E1 is at most 300 μm and optionally E1 is less than E0.

3. The laminated vehicle glazed unit according to claim 1, wherein a minimum concentration C1 m (in g/L) of coloring agent is defined by the following relationship:

$$C1m = \frac{-\log(T\lambda_{max})}{\epsilon \times E1} \quad \text{[Math 6]}$$

wherein:
    $T\lambda_{max}$ is a transmission taken at a position of maximum absorption of the coloring agent such that a light transmission TL in the visible of the masking layer is at most 3% and ε (in L. $g^{-1}.cm^{-1}$) is the absorptivity coefficient.

4. The laminated vehicle glazed unit according to claim 1, wherein the crosslinked polymer matrix is based on acrylate, polyvinyl acetate, polyurethane, epoxy, or silicone.

5. The laminated vehicle glazed unit according to claim 1, wherein the crosslinked polymer matrix is based on acrylate and the masking layer is a coating with E1 of at most 850 µm.

6. The laminated vehicle glazed unit according to claim 1, wherein the masking layer with the crosslinked polymer matrix includes a self-supporting adhesive film that is a mono-or multi-layer.

7. The laminated vehicle glazed unit according to claim 1, wherein the masking layer has a clarity L*1 of less than 5 and optionally the laminated vehicle glazed unit includes an opaque masking layer, absorbing in the visible at the working wavelength, the opaque masking layer having a gap in line with said through-hole at least in a central zone of the through-hole and a colorimetric deviation ΔE* between the masking layer and the opaque masking layer which is less than 4 or even 2.

8. A vehicle laminated glazed unit, with a given thickness, comprising:
  a first glass sheet intended to be an exterior glazed unit, with a first external main face and a second internal main face oriented toward a passenger compartment,
  a lamination interlayer made of polymer material forming an interlayer material having a thickness E0, with a main face oriented toward the second internal main face and another main face opposite the main face,
  a second glass sheet intended to be an interior glazed unit with a third main face oriented toward the second internal main face and a fourth internal main face oriented toward the passenger compartment,
  the first glass sheet has a total iron oxide content by weight of at most 0.05%,
  a through-hole, in a thickness of the second glass sheet, the through-hole being centimetric, the through-hole delimited by a wall, closed or open hole, the through-hole extended by another through-hole forming an interlayer hole in a thickness of the lamination interlayer,
  in a zone of the through-hole, a masking layer including a matrix and a coloring agent dispersed in said matrix, the masking layer absorbing in the visible and transparent at at least one working wavelength in the infrared range from 800 nm to 1800 nm,
  wherein, in the through-hole, a piece, transparent at least at the working wavelength, is provided, the piece having a main bonding surface oriented toward the second internal main face and a main inner surface opposite the bonding surface,
  wherein the masking layer forms an adhesive layer for bonding the piece to the first glass sheet, the masking layer having a thickness E1,
  and the matrix is based on crosslinked polymer, E1 being submillimetric,
  wherein the vehicle laminated glazed unit further comprises an opaque masking layer, absorbing in the visible at the working wavelength, the opaque masking layer having a gap in line with said through-hole at least in a central zone of the through-hole.

9. The laminated vehicle glazed unit according to claim 1, wherein the masking layer is located in the zone of the through-hole, covering the second internal main face.

10. The laminated vehicle glazed unit according to claim 9, wherein the masking layer is located under the piece.

11. The laminated vehicle glazed unit according to claim 1, wherein the masking layer extends beyond the zone of the through-hole under the second glass sheet, forming a first through-hole of the second sheet, and extends in a zone devoid of the lamination interlayer, and wherein the laminated vehicle glazed unit includes a second through-hole of the second glass sheet under the first through-hole, a second through-hole having another piece transparent at the working wavelength and the interlayer hole extends between the first and second through-holes and in a zone of the second through-hole, the masking layer extends in the zone of the second through-hole and forms an adhesive layer bonding the other piece to the first glass sheet.

12. The laminated vehicle glazed unit according to claim 11, further comprising an opaque masking layer which absorbs in the visible at the working wavelength; peripheral and in a region of said through-hole, the masking layer having a gap in line with said first through-hole and in line with the second through-hole and the gap extends between the first and second through-holes.

13. The laminated vehicle glazed unit according to claim 1, wherein the main inner surface includes an antireflective element at said working wavelength facing said through-hole, the first glass sheet, the lamination interlayer, the antireflective element including an antireflective coating on the main inner surface that includes a porous silica layer or the antireflective coating includes a stack of alternating high and low refractive index dielectric layers at said working wavelength.

14. The laminated vehicle glazed unit according to claim 1, wherein the masking layer is in adhesive contact with the bonding surface which is bare or which is with a functional element, said functional element is a functional film or coating for heating or a barrier layer or an adhesion primer and/or the masking layer is in adhesive contact with the second main internal face or with a functional coating on the second main internal face, said functional coating is for heating or as an adhesion primer or as a barrier layer.

15. The laminated vehicle glazed unit according to claim 1, further comprising a local heating zone under and/or in said through-hole, optionally on the bonding surface, by an arrangement of tracks or one or more wires of an electrically conductive material or by a heating layer made of electrically conductive material transparent at said working wavelength, with at least two electrical leads, the heating layer being under the through-hole and extending under the third main face, or the heating layer is on the bonding surface with two local busbars and/or by the masking layer farther toward the outside than the busbars.

16. A device, comprising:
  said laminated vehicle glazed unit according to claim 1, and
  an infrared vision system at the working wavelength in the infrared, arranged in the passenger compartment behind said laminated vehicle glazed unit and including a transmitter and/or receiver, so as to transmit and/or receive radiation passing through the first glass sheet at the through-hole.

17. The vehicle laminated glazed unit according to claim 1, wherein the vehicle laminated glazed unit is a windshield or a rear window.

18. The vehicle laminated glazed unit according to claim 1, wherein the second glass sheet has a total iron oxide content by weight of at least 0.4%.

19. The vehicle laminated glazed unit according to claim 3, wherein the coloring agent is a molecular colorant.

20. The vehicle laminated glazed unit according to claim 8, wherein the opaque masking layer, absorbing in the visible at the working wavelength, is in the form of at least one coating on at least one of the first or second sheets and/or on the lamination interlayer, the opaque masking layer having a gap in line with said through-hole at least in the central zone of the through-hole exceeds at most 50 mm in said through-hole, and wherein on the edge of the through-hole the masking layer is on the opaque masking layer covering at most 50 mm, or is contiguous, or offset by at most 150 µm.

* * * * *